US012811513B2

(12) United States Patent
Slepchenkov

(10) Patent No.: US 12,811,513 B2
(45) Date of Patent: Nov. 24, 2026

(54) MULTI-LEVEL MULTI-QUADRANT HYSTERESIS CURRENT CONTROLLERS AND METHODS FOR CONTROL THEREOF

(71) Applicant: TAE Technologies, Inc., Foothill Ranch, CA (US)

(72) Inventor: Mikhail Slepchenkov, Irvine, CA (US)

(73) Assignee: TAE Technologies, Inc., Foothill Ranch (CA)

( * ) Notice: Subject to any disclaimer, the term of this patent is extended or adjusted under 35 U.S.C. 154(b) by 141 days.

(21) Appl. No.: 18/638,897

(22) Filed: Apr. 18, 2024

(65) Prior Publication Data

US 2025/0192693 A1 Jun. 12, 2025

Related U.S. Application Data

(63) Continuation of application No. 18/124,487, filed on Mar. 21, 2023, now Pat. No. 11,973,436, which is a continuation of application No. 17/643,669, filed on Dec. 10, 2021, now abandoned, which is a continuation of application No. 16/703,761, filed on Dec. 4, 2019, now Pat. No. 11,201,563, which is a continuation of application No. PCT/US2018/037081, filed on Jun. 12, 2018.

(60) Provisional application No. 62/518,331, filed on Jun. 12, 2017.

(51) Int. Cl.

| | |
|---|---|
| ***H02M 7/483*** | (2007.01) |
| ***H02M 7/5387*** | (2007.01) |

(52) U.S. Cl.
CPC ......... *H02M 7/483* (2013.01); *H02M 7/4835* (2021.05); *H02M 7/53871* (2013.01)

(58) Field of Classification Search
CPC . H02M 7/483; H02M 7/53871; H03M 7/4835
See application file for complete search history.

(56) References Cited

U.S. PATENT DOCUMENTS

| | | | | |
|---|---|---|---|---|
| 2007/0147098 A1* | 6/2007 | Mori | H02J 3/1857 | 363/71 |
| 2012/0191391 A1* | 7/2012 | Angquist | H02M 7/49 | 702/64 |
| 2016/0072394 A1* | 3/2016 | Deboy | H02M 7/217 | 363/21.1 |
| 2018/0062536 A1* | 3/2018 | Mondal | H02M 7/483 | |

* cited by examiner

*Primary Examiner* — Alex Torres-Rivera
(74) *Attorney, Agent, or Firm* — ALSTON & BIRD LLP

(57) ABSTRACT

Systems and methods for multilevel hysteresis current control for a cascaded multilevel converter having a plurality of power cells connected in series with a positive integer number of output voltage levels, and to control any shape of AC/DC current in the load, transfer electrical power from energy storage elements of the power cells to that load and recover the energy back to the storage elements. Systems and methods for voltage balancing on energy storage elements of the power cells to determine whether to inject energy into or extract energy from a selected storage element, and for zero switching state rotation technique of switching elements in each power cell of cascaded multilevel converter.

20 Claims, 30 Drawing Sheets

600

MULTI-LEVEL MULTI-QUADRANT HYSTERESIS CURRENT CONTROLLERS AND METHODS FOR CONTROL THEREOF

CROSS-REFERENCE TO RELATED APPLICATION

This patent application is a continuation (and claims the benefit of priority under 35 USC 120) of U.S. patent application Ser. No. 18/124,487, filed Mar. 21, 2023, which is a continuation of U.S. patent application Ser. No. 17/643,669, filed Dec. 10, 2021, which is a continuation U.S. patent application Ser. No. 16/703,761, filed Dec. 4, 2019, which is a continuation of PCT Patent Application No. PCT/US18/37081, filed Jun. 12, 2018, which claims priority to U.S. Provisional Patent Application No. 62/518,331, filed on Jun. 12, 2017, all of which are incorporated by reference herein in their entirety for all purposes.

TECHNICAL FIELD

The present disclosure relates to power electronics circuits, and more particularly to multi-level multi-quadrant hysteresis current controllers and methods for control thereof.

BACKGROUND

In electrical engineering, power engineering, and the electric power industry, power conversion is converting electric energy from one form to another (e.g., converting between AC and DC, adjusting the voltage or frequency, or some combination of these). A power converter is an electrical or electro-mechanical device for converting electrical energy. A power converter can be as simple as a transformer to change the voltage of AC (i.e., alternating current) power, but can also be implemented using far more complex systems. The term “power converter” can also refer to a class of electrical machinery that is used to convert one frequency of alternating current into another frequency. Power conversion systems often incorporate redundancy and voltage regulation.

Power converters are restricted in their operational capacities by their switching devices, whose operational limitations (i.e., a permissible operating voltage and maximum current) are imposed by the physical characteristics of the semiconductor materials used for manufacturing them. Multilevel topologies, such as Diode-Clamped Topology, Flying Capacitor Topology and Cascaded (including Hybrid) Topologies increase the working voltage of the converters. As the numbers of levels and switches increase, more elaborate control and switching methods are necessary to obtain the desired voltage and/or current at the output of a multilevel converter.

Methods of controlling current also play an important role in power electronic circuits, particularly in continuous AC power supplies where the objective is to produce a sinusoidal AC output (e.g., in current regulated PWM inverters widely applied in AC motor drives, and in continuous DC power supplies for DC motors or powerful magnets). The main task of the control systems in current regulated converters is to force the current in the load according to a reference trajectory.

Hysteresis is a phenomenon in which the response of a physical system to an external influence depends not only on the present magnitude of that influence but also on the previous history of the system. Expressed mathematically, the response to the external influence is a doubled-valued function; one value applies when the influence is increasing, while the other value applies when the influence is decreasing.

There are three major classes of current regulators: hysteresis regulators, linear PI regulators, and predictive dead-beat regulators. Among these classes, the hysteresis band current control remains the simplest method. Besides fast response current loop, the hysteresis band current control method does not require any knowledge of load parameters. However, the hysteresis current control technique for multilevel converters becomes increasingly complicated with an increased number of levels.

In view of the foregoing limitations, it is desirable to provide simple and effective methods of multilevel four-quadrant and two-quadrant hysteresis current control.

SUMMARY

The embodiments of the present disclosure are directed to systems and methods that facilitate simple and effective multilevel four- and two-quadrant hysteresis current control methods for widely used single-phase or multiple-phase cascaded multilevel converters with one or more output voltage levels. A single-phase or multiple-phase cascaded multilevel converter comprises a plurality of power cells connected in series in each phase with a positive integer number of output voltage levels. The systems and methods of multilevel four- and two-quadrant hysteresis current control presented herein effectively and precisely control any shape of AC/DC current in the load, transfer electrical power from energy storage elements of the power cells to that load, and, in the case of a reactive or regenerative load, recover the energy back to the storage elements. The embodiments are also directed to a method of balancing voltages on energy storage elements of the power cells of the cascaded multilevel converter, which includes a selection of the storage elements with maximum and minimum voltages (based on the voltages of energy storage elements of all power cells), and which performs a balance determination regarding whether to inject energy into a selected storage element from the reactive or regenerative load, or to extract energy from a selected storage element into the reactive or regenerative load. In addition, the embodiments include a zero switching state rotation technique to minimize a number of commutations of all switching elements in each power cell of cascaded multilevel converter.

The embodiments presented herein may advantageously be used in a variety of applications in which current regulated converters are employed. Examples of such applications may include, without limitation, power electronics circuits comprising: electromagnets for plasma reactors, including poloidal and toroidal field magnets of Tokamaks, and equilibrium and trim magnets of field reversed configuration (FRC) reactors; acceleration magnets of linear accelerators (LINACs); electrical motors of any type and any power rating, including PMSM and switched reluctance motors (SRM) with multiple phases; grid-connected energy storage systems; STATCOMs for reactive power compensation, high current harmonics filtering and voltage stabilization; and grid-connected photovoltaic systems.

Other systems, methods, features and advantages of the example embodiments will be or will become apparent to one with skill in the art upon examination of the following figures and detailed description. It will be appreciated that “two-quadrant” and “2-quadrant” are used herein interchangeably. It will be appreciated that "four-quadrant" and "4-quadrant" are used herein interchangeably.

BRIEF DESCRIPTION OF THE DRAWINGS

The details of the example embodiments, including structure and operation, may be gleaned in part by study of the accompanying figures, in which like reference numerals refer to like parts. The components in the figures are not necessarily to scale, emphasis instead being placed upon illustrating the principles of the disclosure. Moreover, all illustrations are intended to convey concepts, where relative sizes, shapes and other detailed attributes may be illustrated schematically rather than literally or precisely.

FIG. 15A illustrates exemplary simulated magnet currents over time; FIG. 15B illustrates exemplary simulated PSU output voltages over time; FIG. 15C illustrates exemplary simulated control error signals over time; FIG. 15D illustrates exemplary simulated DCL-Voltage of cells over time.

FIG. 15E illustrates exemplary experimental results for magnet current over time; FIG. 15F illustrates exemplary experimental results for PSU output voltages over time; FIG. 15G illustrates exemplary experimental results for control error signals over time; FIG. 15H illustrates exemplary experimental results for DCL-Voltage of cells over time.

FIG. 16A illustrates exemplary simulated real and reference currents over time; FIG. 16B illustrates exemplary simulated control error signals over time; FIG. 16C illustrates exemplary simulated PSU output voltages over time.

FIG. 18A illustrates exemplary simulated phase flux-linkages over time; FIG. 18B illustrates exemplary simulated phase currents over time; FIG. 18C illustrates exemplary simulated motor torque over time; FIG. 18D illustrates exemplary simulated motor speed over time.

FIG. 19A illustrates exemplary simulated phase flux-linkages over time; FIG. 19B illustrates exemplary simulated phase currents over time; FIG. 19C illustrates exemplary simulated motor torque over time; FIG. 19D illustrates exemplary simulated motor speed over time.

FIGS. 20A, 20B, 20C and 20D illustrate exemplary simulated output voltages for individual cells over time; FIG. 20E illustrates exemplary simulated output voltage of the converter over time.

It should be noted that elements of similar structures or functions are generally represented by like reference numerals for illustrative purpose throughout the figures. It should also be noted that the figures are only intended to facilitate the description of the preferred embodiments.

DETAILED DESCRIPTION

Figure 1A:
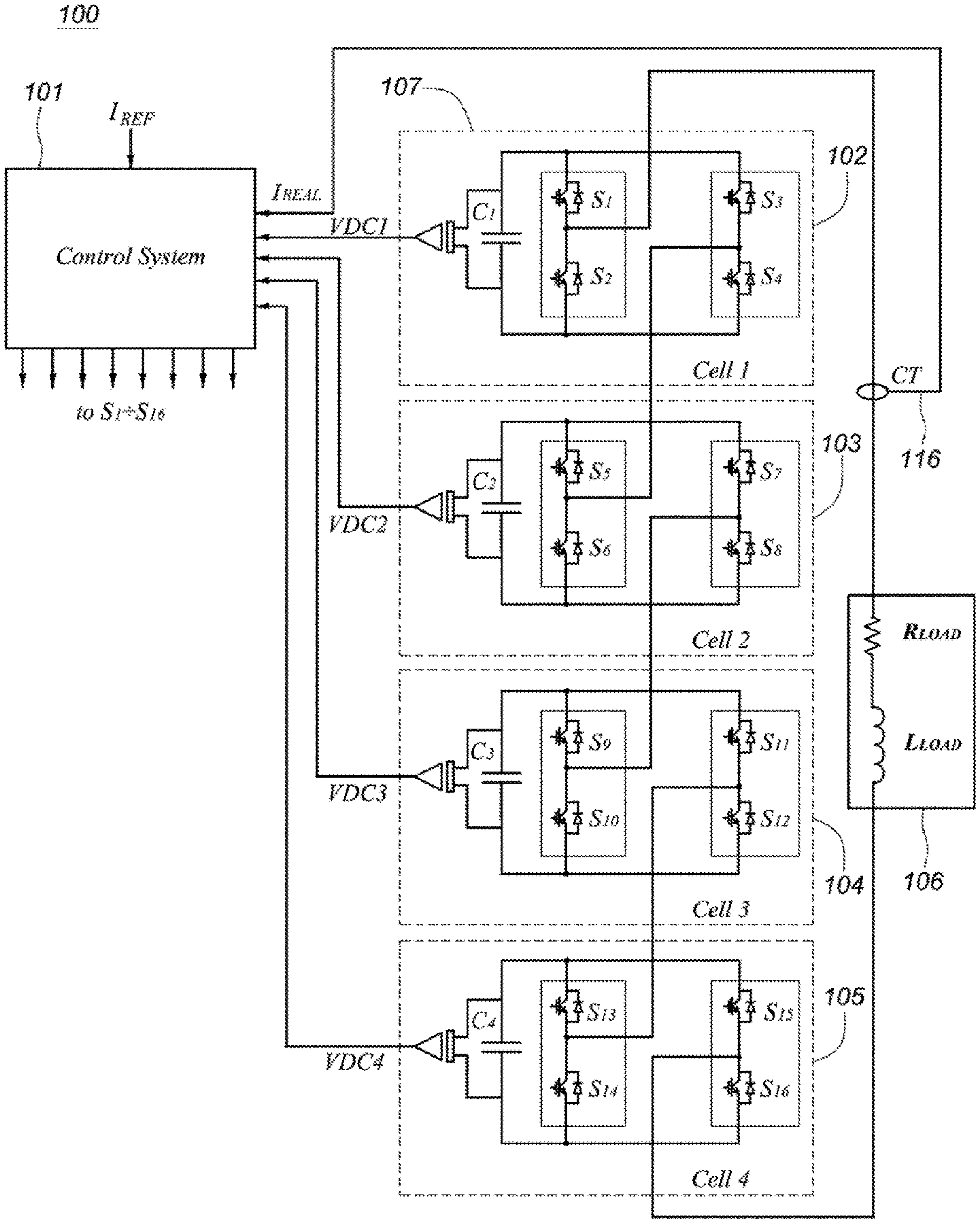
FIG. 1A illustrates a schematic of an exemplary multi-level multi-quadrant system according to embodiments of the present disclosure.

The following embodiments are described in detail to enable those skilled in the art to make and use various embodiments of the present disclosure. It is understood that other embodiments would be evident based on the present disclosure, and that system, process, or changes may be made without departing from the scope of the present embodiments.

In the following description, numerous specific details are given to provide a thorough understanding of the present embodiments. However, it will be apparent that the present embodiments may be practiced without these specific details. In order to increase clarity, some well-known circuits, system configurations, and process steps may not be described in detail.

The drawings showing embodiments of the present disclosure are semi-diagrammatic and not to scale and, particularly, some of the dimensions are for the clarity of presentation and are shown exaggerated in the drawing figures.

FIG. 1A illustrates a schematic of an exemplary multilevel multi-quadrant power electronics system 100 according to embodiments of the present disclosure. An exemplary four-quadrant nine-level single-phase cascaded converter 107 has capacitive storage elements and a control system 101, and is connected to a load 106 such as, e.g., a single-phase resistively inductive load as shown. A load 106 may include electromagnets, electric motors, and the like. Functions of the control system 101 may be implemented using either software or hardware processors including software routines, hardware components, or combinations thereof.

Figure 1B:
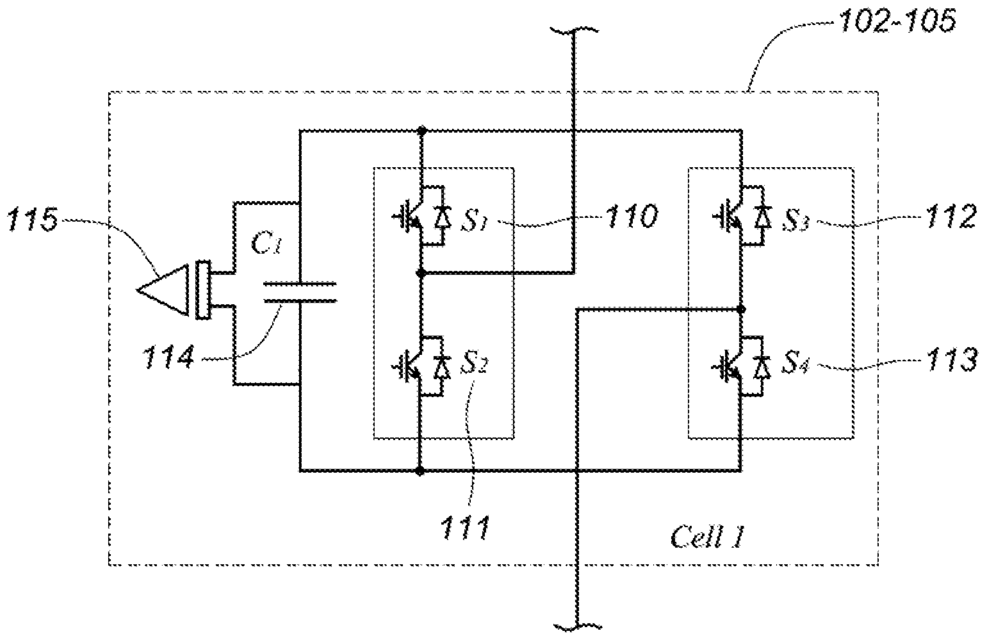
FIG. 1B illustrates an exemplary cell of an exemplary nine level four-quadrant system according to embodiments of the present disclosure.

In embodiments, the converter 107 with capacitive storage elements comprises four (4) series connected cells 102, 103, 104, and 105. In embodiments, each of the series connected cells 102, 103, 104, and 105 represents an H-bridge converter having, as shown in FIG. 1B in regards to exemplary cell 102, four (4) bidirectional switches 110, 111, 112, and 113 (such as, e.g., an IGBT or a MOSFET with a freewheeling diode), and a capacitor 114. All four capacitors 114 of the converter 107 are isolated from each other and can be connected to any individually isolated AC/DC or DC/DC converter (not shown in the figure). In embodiments, each of the series connected cells 102, 103, 104, and 105 includes a voltage sensor/transmitter 115 that transmits a voltage feedback signal to the control system 101 corresponding to the DC voltage of the capacitor or storage element 114. A current sensor/transmitter CT 116 interposes the converter 107 and the load 106 and transmits a current feedback signal corresponding to the current ($I_{Real}$) in the load 106.

Since the converter 107 is a four-quadrant converter, which means that both output current and output voltage can be positive or negative in any combination, the converter 107 can operate not only in a bidirectional DC/DC regime, but also in rectification or inversion mode. It will be appreciated that in this disclosure, only inversion operational mode is explained as an example. For the purposes of this discussion, it is also assumed that the converter is working for a short interval of time, such as, e.g., several milliseconds, so there is no additional source of energy required for the storage elements (capacitors) 114 and the voltage on the capacitors 114 is not significantly reduced during an operational time to maintain a desired current in the load 106. Nevertheless, there will be no difference in the operation of the present method in presence of additional energy sources such as, e.g., capacitors, supercapacitors, batteries, fuel cells, and the like.

All possible switching states of the exemplary four-quadrant nine-level cascaded converter 107 with corresponding output voltage levels are presented in Table 1. Only switching states for the odd switching elements (i.e., $S_1$, $S_3$, $S_5$, $S_7$, $S_9$, $S_{11}$, $S_{13}$ and $S_{15}$) of the converter 107 are presented in Table 1.In fact, to avoid a short circuit of the storage element or capacitor 114, only one switch in a half-bridge of an H-bridge converter can be ON (in conducting mode) at any moment of time. Thus, the control signals for the even switching elements (i.e., $S_2$, $S_4$, $S_6$, $S_8$, $S_{10}$, $S_{12}$, $S_{14}$ and $S_{16}$) of the converter 107 can be easily obtained by reversing the states of odd switching elements of the same half-bridge of the H-bridge converter. For example, if S1=1 and S3=0, then S2=0 and S4=1.

Zero output voltage 0 VDC can be ensured if all cells 102, 103, 104 and 105 operate at zero state at the same time. This can be obtained by bypassing the storage element or capacitor 114 by switching ON both upper switches or both lower switches. For instance, for Cell 1 102: S1=1, S3=1, S2=0, S4=0 or S1=0, S3=0, S2=1, S4=1.

Both voltage levels −3 VDC and +3 VDC can be obtained using four various combinations ±3 VDC1, ±3 VDC2, ±3 VDC3, ±3 VDC4, where the last index corresponds to a number of the cell operating at zero state, providing a zero output voltage. In turn, each zero state can be coded using the two combinations of switching mentioned above. Thus, there are eight possible combinations of setting a ±3 VDC output voltage level.

Similarly, both voltage levels −2 VDC and +2 VDC can be set by five different combinations ±2 VDC12, ±2 VDC13, ±2 VDC14, ±2 VDC23, ±2 VDC24 depending on which two cells operate at zero state voltage, where the last index corresponds to the numbers of the combination of two cells operating at zero state, providing a zero output voltage. Taking into account a dual possibility of providing a zero state, a total number of possible combinations for ±2 VDC is equal to ten.

Both voltage levels −1 VDC and +1 VDC can be obtained using four various combinations ±1 VDC1, ±1 VDC2, ±1 VDC3, ±1 VDC4. The last index corresponds to the number of the cell operating at ±1 VDC level. Again, each zero state is obtained dually. Thus, like for ±3 VDC level, there are eight possible combinations of providing ±1 VDC output voltage level.

Finally, the maximum voltage levels −4 VDC and +4 VDC can be provided at the output of converter when all cells are operating at the same time. Thus, there is only one available combination of switching state for each these cases.

TABLE 1

Switching States of 9-level 4-quadrant Multilevel Cascaded Converter

| Output Voltage | S1 | S3 | S5 | S7 | S9 | S11 | S13 | S15 |
|---|---|---|---|---|---|---|---|---|
| −4 VDC | 0 | 1 | 0 | 1 | 0 | 1 | 0 | 1 |
| −3 VDC | | | | | | | | |
| −3 VDC1 | 1 | 1 | 0 | 1 | 0 | 1 | 0 | 1 |
| | 0 | 0 | 0 | 1 | 0 | 1 | 0 | 1 |
| −3 VDC2 | 0 | 1 | 1 | 1 | 0 | 1 | 0 | 1 |
| | 0 | 1 | 0 | 0 | 0 | 1 | 0 | 1 |
| −3 VDC3 | 0 | 1 | 0 | 1 | 1 | 1 | 0 | 1 |
| | 0 | 1 | 0 | 1 | 0 | 0 | 0 | 1 |
| −3 VDC4 | 0 | 1 | 0 | 1 | 0 | 1 | 1 | 1 |
| | 0 | 1 | 0 | 1 | 0 | 1 | 0 | 0 |
| −2 VDC | | | | | | | | |
| −2 VDC12 | 1 | 1 | 1 | 1 | 0 | 1 | 0 | 1 |
| | 0 | 0 | 0 | 0 | 0 | 1 | 0 | 1 |
| −2 VDC13 | 1 | 1 | 0 | 1 | 1 | 1 | 0 | 1 |
| | 0 | 0 | 0 | 1 | 0 | 0 | 0 | 1 |
| −2 VDC14 | 1 | 1 | 0 | 1 | 0 | 1 | 1 | 1 |
| | 0 | 0 | 0 | 1 | 0 | 1 | 0 | 0 |
| −2 VDC23 | 0 | 1 | 1 | 1 | 1 | 1 | 0 | 1 |
| | 0 | 1 | 0 | 0 | 0 | 0 | 0 | 1 |
| −2 VDC24 | 0 | 1 | 1 | 1 | 0 | 1 | 1 | 1 |
| | 0 | 1 | 0 | 0 | 0 | 1 | 0 | 0 |
| −1 VDC | | | | | | | | |
| −1 VDC1 | 0 | 1 | 1 | 1 | 1 | 1 | 1 | 1 |
| | 0 | 1 | 0 | 0 | 0 | 0 | 0 | 0 |
| −1 VDC2 | 1 | 1 | 0 | 1 | 1 | 1 | 1 | 1 |
| | 0 | 0 | 0 | 1 | 0 | 0 | 0 | 0 |
| −1 VDC3 | 1 | 1 | 1 | 1 | 0 | 1 | 1 | 1 |
| | 0 | 0 | 0 | 0 | 0 | 1 | 0 | 0 |
| −1 VDC4 | 1 | 1 | 1 | 1 | 1 | 1 | 0 | 1 |
| | 0 | 0 | 0 | 0 | 0 | 0 | 0 | 1 |
| 0 | 1 | 1 | 1 | 1 | 1 | 1 | 1 | 1 |
| | 0 | 0 | 0 | 0 | 0 | 0 | 0 | 0 |
| +1 VDC | | | | | | | | |
| +1 VDC1 | 1 | 0 | 1 | 1 | 1 | 1 | 1 | 1 |
| | 1 | 0 | 0 | 0 | 0 | 0 | 0 | 0 |
| +1 VDC2 | 1 | 1 | 1 | 0 | 1 | 1 | 1 | 1 |
| | 0 | 0 | 1 | 0 | 0 | 0 | 0 | 0 |
| +1 VDC3 | 1 | 1 | 1 | 1 | 1 | 0 | 1 | 1 |
| | 0 | 0 | 0 | 0 | 1 | 0 | 0 | 0 |
| +1 VDC4 | 1 | 1 | 1 | 1 | 1 | 1 | 1 | 0 |
| | 0 | 0 | 0 | 0 | 0 | 0 | 1 | 0 |
| +2 VDC | | | | | | | | |
| +2 VDC12 | 1 | 1 | 1 | 1 | 1 | 0 | 1 | 0 |
| | 0 | 0 | 0 | 0 | 1 | 0 | 1 | 0 |
| +2 VDC13 | 1 | 1 | 1 | 0 | 1 | 1 | 1 | 0 |
| | 0 | 0 | 1 | 0 | 0 | 0 | 1 | 0 |
| +2 VDC14 | 1 | 1 | 1 | 0 | 1 | 0 | 1 | 1 |
| | 0 | 0 | 1 | 0 | 1 | 0 | 0 | 0 |
| +2 VDC23 | 1 | 0 | 1 | 1 | 1 | 1 | 1 | 0 |
| | 1 | 0 | 0 | 0 | 0 | 0 | 1 | 0 |
| +2 VDC24 | 1 | 0 | 1 | 1 | 1 | 0 | 1 | 1 |
| | 1 | 0 | 0 | 0 | 1 | 0 | 0 | 0 |
| +3 VDC | | | | | | | | |
| +3 VDC1 | 1 | 1 | 1 | 0 | 1 | 0 | 1 | 0 |
| | 0 | 0 | 1 | 0 | 1 | 0 | 1 | 0 |

TABLE 1-continued

Switching States of 9-level 4-quadrant Multilevel Cascaded Converter

| Output Voltage | S1 | S3 | S5 | S7 | S9 | S11 | S13 | S15 |
|---|---|---|---|---|---|---|---|---|
| +3 VDC2 | 1 | 0 | 1 | 1 | 1 | 0 | 1 | 0 |
| | 1 | 0 | 0 | 0 | 1 | 0 | 1 | 0 |
| +3 VDC3 | 1 | 0 | 1 | 0 | 1 | 1 | 1 | 0 |
| | 1 | 0 | 1 | 0 | 0 | 0 | 1 | 0 |
| +3 VDC4 | 1 | 0 | 1 | 0 | 1 | 0 | 1 | 1 |
| | 1 | 0 | 1 | 0 | 1 | 0 | 0 | 0 |
| +4 VDC | 1 | 0 | 1 | 0 | 1 | 0 | 1 | 0 |

Figure 2A:
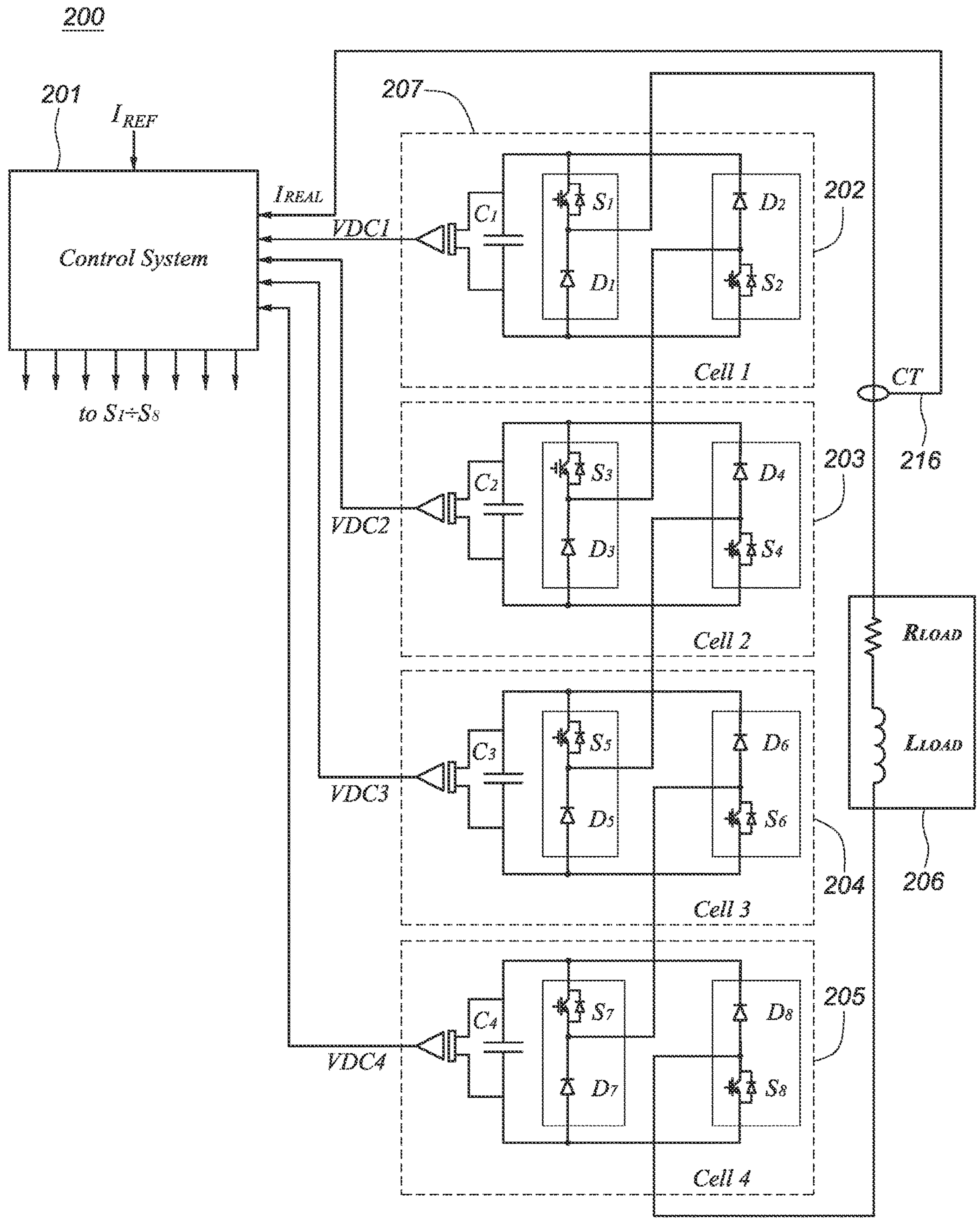
FIG. 2A illustrates a schematic of an exemplary multi-level multi-quadrant system according to embodiments of the present disclosure.

FIG. 2A illustrates a schematic of an exemplary multi-level multi-quadrant power electronics system 200 according to embodiments of the present disclosure. The exemplary power electronics system 200 includes a two-quadrant nine-level single-phase cascaded converter 207 having capacitive storage elements and a control system 201, and is connected to a load 206 such as, e.g., a single-phase resistively inductive load. Functions of the control system 201 may be implemented using either software or hardware processors including software routines, hardware components, or combinations thereof.

Figure 2B:
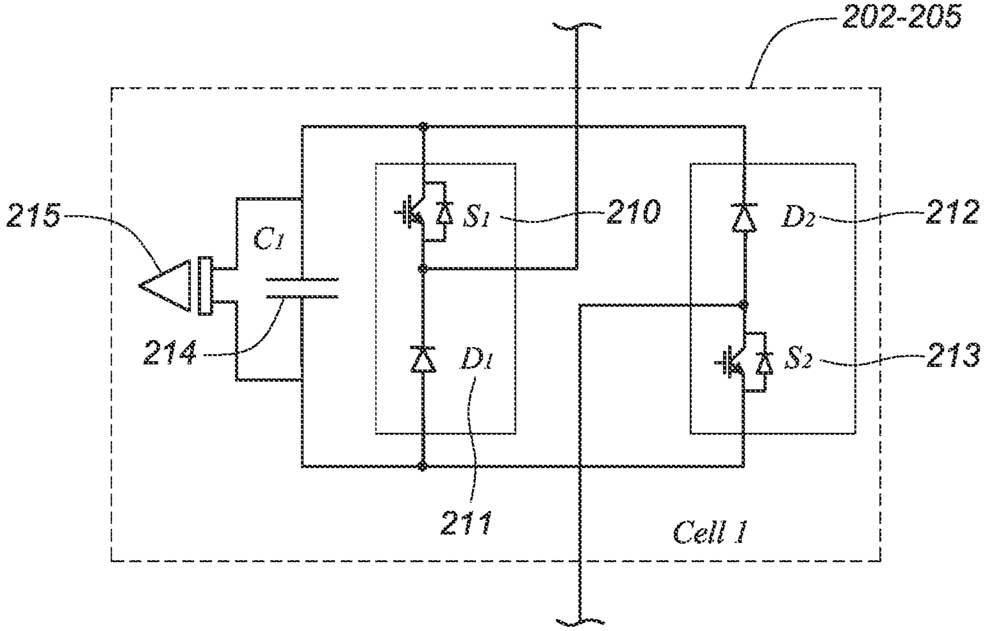
FIG. 2B illustrates an exemplary cell of an exemplary nine level two-quadrant system according to embodiments of the present disclosure.

In embodiments, the two-quadrant nine-level single-phase cascaded converter 207 with capacitive storage elements further comprises four (4) series connected cells 202, 203, 204 and 205, where each cell represents a two-quadrant H-bridge converter with, as shown in FIG. 2B, two bidirectional switches 210 and 213 (such as, e.g., an IGBT or a MOSFET with a freewheeling diode), two diodes 211, 212, and a capacitor 214. All four capacitors 214 of the converter 207 are isolated from each other and can be connected to any individually isolated AC/DC or DC/DC converter (not shown in the figure). Each of the series connected cells 202, 203, 204, and 205 includes a voltage sensor/transmitter 215 that transmits a voltage feedback signal to the control system 201 corresponding to the DC voltage of the capacitor or storage element 214. A current sensor/transmitter CT 216 interposes the converter 207 and the load 206 and transmits a current feedback signal corresponding to the current ($I_{Real}$) in the load 206.

Since the converter 207 is a two-quadrant converter, which means that at only positive output current the output voltage can be positive or negative, the converter 207 can operate only in a unidirectional active DC/DC regime, or in a passive rectification mode only (AC/DC). It will be appreciated that DC/DC operational mode is discussed in this disclosure. For the purpose of this discussion, it is also assumed that the converter is working for a short interval of time, so there is no additional source of energy required for the storage elements (capacitors) 214 and the voltage on the capacitors 214 is not significantly reduced during an operational time to maintain a desired current in the load 206. Nevertheless, there will be no difference in the operation of the present method in the presence of additional energy sources.

All possible switching states of the exemplary two-quadrant nine-level cascaded converter 207 with corresponding output voltage levels are presented in Table 2. The switching states for both switching elements (i.e., $S_1$, $S_2$, $S_3$, $S_4$, $S_5$, $S_6$, $S_7$ and $S_8$) of each cell of the converter 207 are presented in Table 2.

Zero output voltage 0 VDC can be ensured if all cells 202, 203, 204 and 205 operate at zero state at the same time. This can be obtained by bypassing the storage element or capacitor 214 by switching ON the upper or lower switches separately. For instance, for Cell 1 202: S1=1, S2=0 or S1=0, S2=1.

Both voltage levels −3 VDC and +3 VDC can be obtained using four various combinations ±3 VDC1, ±3 VDC2, ±3 VDC3, ±3 VDC4, where the last index corresponds to a number of cells operating at zero state, providing a zero output voltage. In turn, each zero state can be coded using the two combinations of switching mentioned above. Thus, there are eight possible combinations of setting ±3 VDC output voltage level.

Similarly, both voltage levels −2 VDC and +2 VDC can be set by five different combinations ±2 VDC12, ±2 VDC13, ±2 VDC14, ±2 VDC23, ±2 VDC24 depending on which two cells operate at zero state voltage. Taking into account a dual possibility of providing a zero state, a total number of possible combinations for ±2 VDC is equal to ten.

Both voltage levels −1 VDC and +1 VDC can be obtained using four various combinations ±1 VDC1, ±1 VDC2, ±1 VDC3, ±1 VDC4. The last index corresponds to a number of cell operating at ±1 VDC level. Again, each zero state is obtained dually. Thus, like for ±3 VDC level, there are eight possible combinations of providing +1 VDC output voltage level.

Finally, the maximum voltage levels −4 VDC and +4 VDC can be provided at the output of converter when all cells are operating at the same time. Thus, there is only one available combination of switching state for each these cases.

TABLE 2

Switching States of 9-level 2-quadrant Multilevel Cascaded Converter

| Output | Switching States | | | | | | | |
|---|---|---|---|---|---|---|---|---|
| Voltage | S1 | S2 | S3 | S4 | S5 | S6 | S7 | S8 |
| −4 VDC | 0 | 0 | 0 | 0 | 0 | 0 | 0 | 0 |
| −3 VDC | | | | | | | | |
| −3 VDC1 | 1 | 0 | 0 | 0 | 0 | 0 | 0 | 0 |
| | 0 | 1 | 0 | 0 | 0 | 0 | 0 | 0 |
| −3 VDC2 | 0 | 0 | 1 | 0 | 0 | 0 | 0 | 0 |
| | 0 | 0 | 0 | 1 | 0 | 0 | 0 | 0 |
| −3 VDC3 | 0 | 0 | 0 | 0 | 1 | 0 | 0 | 0 |
| | 0 | 0 | 0 | 0 | 0 | 1 | 0 | 0 |
| −3 VDC4 | 0 | 0 | 0 | 0 | 0 | 0 | 1 | 0 |
| | 0 | 0 | 0 | 0 | 0 | 0 | 0 | 1 |
| −2 VDC | | | | | | | | |
| −2 VDC12 | 1 | 0 | 1 | 0 | 0 | 0 | 0 | 0 |
| | 0 | 1 | 0 | 1 | 0 | 0 | 0 | 0 |
| −2 VDC13 | 1 | 1 | 0 | 0 | 1 | 0 | 0 | 0 |
| | 0 | 1 | 0 | 0 | 0 | 1 | 0 | 0 |
| −2 VDC14 | 1 | 1 | 0 | 0 | 0 | 0 | 1 | 0 |
| | 0 | 1 | 0 | 0 | 0 | 0 | 0 | 1 |
| −2 VDC23 | 0 | 0 | 1 | 0 | 1 | 0 | 0 | 0 |
| | 0 | 0 | 0 | 1 | 0 | 1 | 0 | 0 |
| −2 VDC24 | 0 | 0 | 1 | 0 | 0 | 0 | 1 | 0 |
| | 0 | 0 | 0 | 1 | 0 | 0 | 0 | 1 |
| −1 VDC | | | | | | | | |
| −1 VDC1 | 0 | 0 | 1 | 0 | 1 | 0 | 1 | 0 |
| | 0 | 0 | 0 | 1 | 0 | 1 | 0 | 1 |
| −1 VDC2 | 1 | 0 | 0 | 0 | 1 | 0 | 1 | 0 |
| | 0 | 1 | 0 | 0 | 0 | 1 | 0 | 1 |
| −1 VDC3 | 1 | 0 | 1 | 0 | 0 | 0 | 1 | 0 |
| | 0 | 1 | 0 | 1 | 0 | 0 | 0 | 1 |
| −1 VDC4 | 1 | 0 | 1 | 0 | 1 | 0 | 0 | 0 |
| | 0 | 1 | 0 | 1 | 0 | 1 | 0 | 0 |
| 0 | 1 | 0 | 1 | 0 | 1 | 0 | 1 | 0 |
| | 0 | 1 | 0 | 1 | 0 | 1 | 0 | 1 |

TABLE 2-continued

Switching States of 9-level 2-quadrant Multilevel Cascaded Converter

| Output | Switching States | | | | | | | |
|---|---|---|---|---|---|---|---|---|
| Voltage | S1 | S2 | S3 | S4 | S5 | S6 | S7 | S8 |
| +1 VDC | | | | | | | | |
| +1 VDC1 | 1 | 1 | 1 | 0 | 1 | 0 | 1 | 0 |
| | 1 | 1 | 0 | 1 | 0 | 1 | 0 | 1 |
| +1 VDC2 | 1 | 0 | 1 | 1 | 1 | 0 | 1 | 0 |
| | 0 | 1 | 1 | 1 | 0 | 1 | 0 | 1 |
| +1 VDC3 | 1 | 1 | 1 | 1 | 1 | 1 | 1 | 1 |
| | 0 | 1 | 0 | 1 | 1 | 1 | 0 | 1 |
| +1 VDC4 | 1 | 0 | 1 | 0 | 1 | 0 | 1 | 1 |
| | 0 | 1 | 0 | 1 | 0 | 1 | 1 | 1 |
| +2 VDC | | | | | | | | |
| +2 VDC12 | 1 | 0 | 1 | 0 | 1 | 1 | 1 | 1 |
| | 0 | 1 | 0 | 1 | 1 | 1 | 1 | 1 |
| +2 VDC13 | 1 | 0 | 1 | 1 | 1 | 0 | 1 | 1 |
| | 0 | 1 | 1 | 1 | 0 | 1 | 1 | 1 |
| +2 VDC14 | 1 | 0 | 1 | 1 | 1 | 1 | 1 | 0 |
| | 0 | 1 | 1 | 1 | 1 | 1 | 0 | 1 |
| +2 VDC23 | 1 | 1 | 1 | 0 | 1 | 0 | 1 | 1 |
| | 1 | 1 | 0 | 1 | 0 | 1 | 1 | 1 |
| +2 VDC24 | 1 | 1 | 1 | 0 | 1 | 1 | 1 | 0 |
| | 1 | 1 | 0 | 1 | 1 | 1 | 0 | 1 |
| +3 VDC | | | | | | | | |
| +3 VDC1 | 1 | 0 | 1 | 1 | 1 | 1 | 1 | 1 |
| | 0 | 1 | 1 | 1 | 1 | 1 | 1 | 1 |
| +3 VDC2 | 1 | 1 | 1 | 0 | 1 | 1 | 1 | 1 |
| | 1 | 1 | 0 | 1 | 1 | 1 | 1 | 1 |
| +3 VDC3 | 1 | 1 | 1 | 1 | 1 | 0 | 1 | 1 |
| | 1 | 1 | 1 | 1 | 0 | 1 | 1 | 1 |
| +3 VDC4 | 1 | 1 | 1 | 1 | 1 | 1 | 1 | 0 |
| | 1 | 1 | 1 | 1 | 1 | 1 | 0 | 1 |
| +4 VDC | 1 | 1 | 1 | 1 | 1 | 1 | 1 | 1 |

Figure 3:
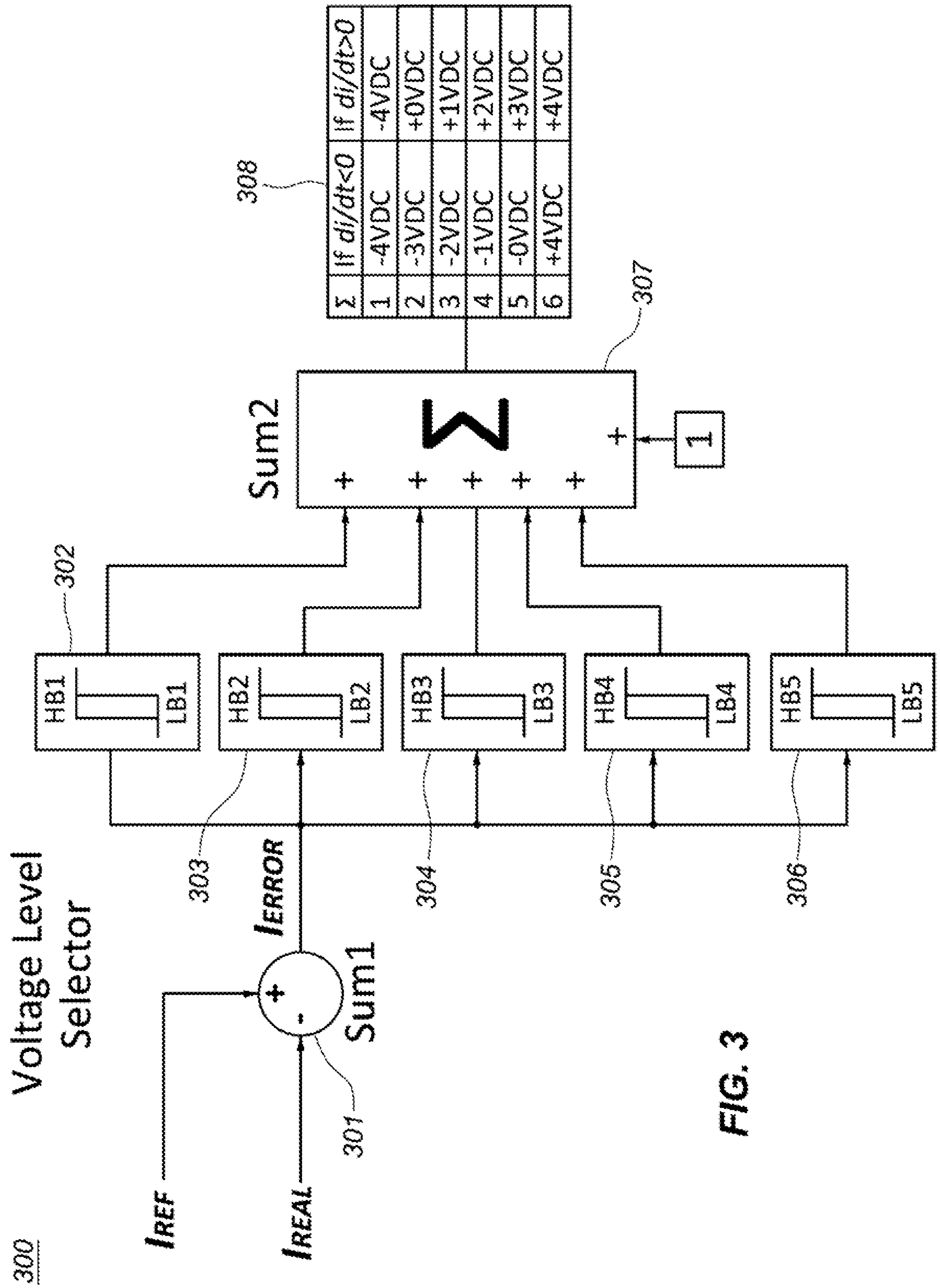
FIG. 3 illustrates an exemplary voltage level selector according to embodiments of the present disclosure.

FIG. 3 illustrates an exemplary voltage level selector module 300 (also referred to as a switch state selector) of a hysteresis controller (see FIG. 5; 500) of the control system 101 and 201 according to embodiments of the present disclosure. As explained above, every voltage level of the four-quadrant nine-level cascaded converter 107 or the two-quadrant nine-level cascaded converter 207 can be obtained by different switching combinations of the four power cells 102-105 and 202-205, respectively. However, a significant issue that arises in a multi-level four-quadrant or two-quadrant hysteresis controller, and, addressed by the embodiments of the present disclosure, is the identification of an appropriate output voltage level at any moment of converter operation based on a current feedback signal $I_{REAL}$.

The voltage level selector 300 comprises two sum blocks Sum1 301 and Sum2 307, five hysteresis blocks 302, 303, 304, 305, 306, and one lookup table 308 for voltage level determination. In embodiments, in the first sum block Sum1 301, the real feedback current signal $I_{REAL}$ is subtracted from the reference current $I_{REF}$ and their difference, the current error signal $I_{ERROR}$, is input into the input of all five hysteresis blocks 302, 303, 304, 305, 306. Each of these blocks (302, 303, 304, 305, 306) has different settings for high (HB) boundary and low (LB) boundary thresholds as presented in Table 3, where ΔI is a preset value of a maximum permitted current error. When the $I_{ERROR}$ reaches the corresponding high boundary (HB) of the hysteresis block, the output value of the hysteresis block is set to "1" and remains at this level until $I_{ERROR}$ crosses the low boundary (LB) of the hysteresis block. When the $I_{ERROR}$ reaches the corresponding LB of the hysteresis block, the output value of the hysteresis block is set to "0" and the output is maintained at this level until $I_{ERROR}$ reaches the HB again. Thus, if low and high boundaries of the five hysteresis blocks are distributed within a range between −ΔI and +ΔI (as shown in Table 3), then the output of Sum2 307 will be varying from 1 to 6, depending on $I_{ERROR}$ value. The look-up table 308 is used for the determination of a required output voltage level based on the total state value (output of Sum2 307) of hysteresis blocks 302-306 and taking into account a sign of real (or reference) current derivative di/dt. As discussed below, a sign of di/dt can be determined as positive at the moment of time, when Sum2 307 reaches a value of 6, and will be changed to a negative one, when Sum2 307 becomes equal to 1.

TABLE 3

Current Threshold Levels for Hysteresis Blocks.

| Hysteresis Boundary | Current threshold |
|---|---|
| HB1 | ΔI/5 |
| LB1 | −ΔI/5 |
| HB2 | 2ΔI/5 |
| LB2 | −2ΔI/5 |
| HB3 | 3ΔI/5 |
| LB3 | −3ΔI/5 |
| HB4 | 4ΔI/5 |
| LB4 | −4ΔI/5 |
| HB5 | ΔI |
| LB5 | −ΔI |

The following discussion and related figures present a detailed description of the principle of switching between voltage levels in the presently disclosed multi-level multi-quadrant hysteresis control technique based on the simulation results of an exemplary nine-level cascaded one-phase converter operation.

Figures 4A, 4B, 4C:
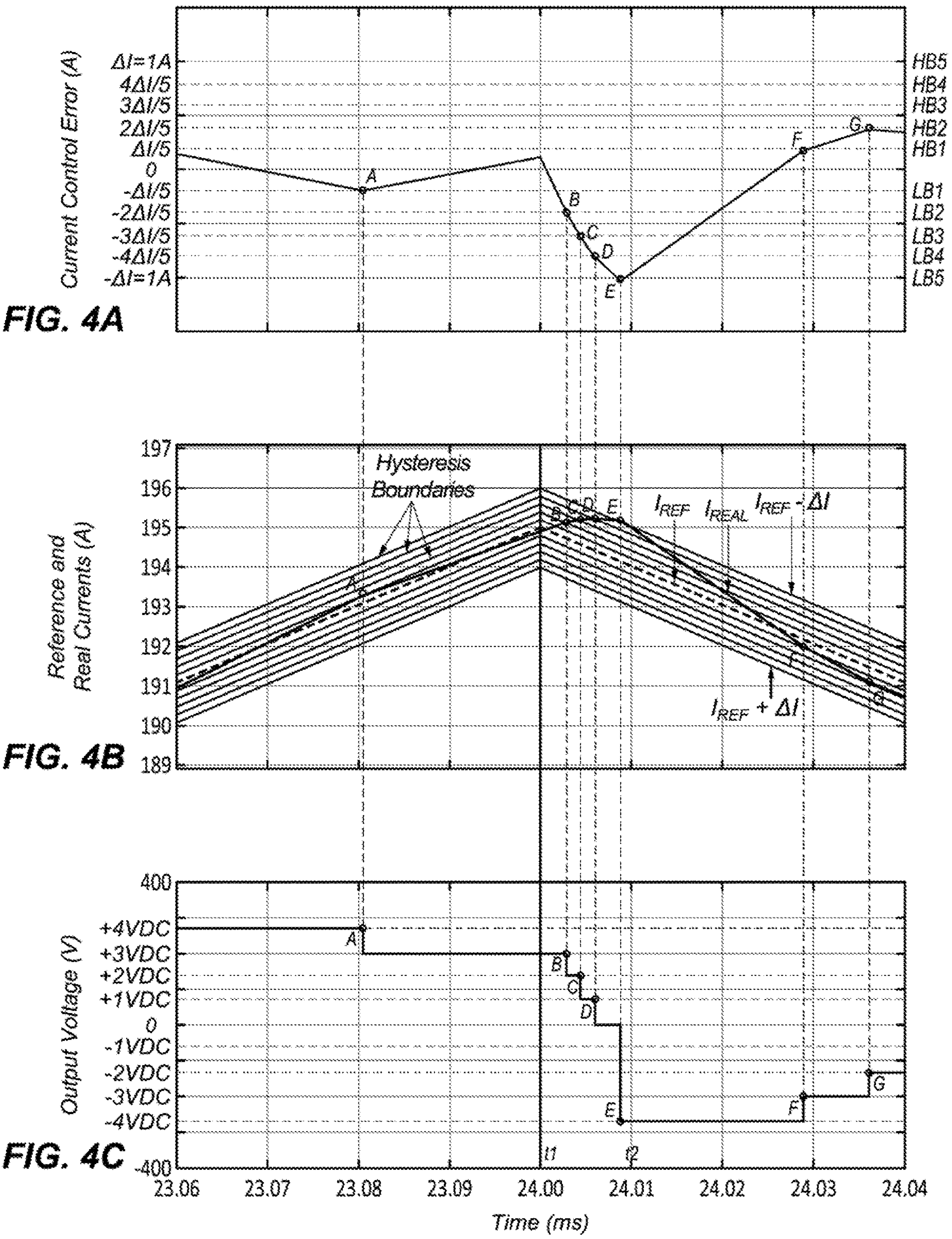
FIG. 4A illustrates exemplary current control over time according to embodiments of the present disclosure.
FIG. 4B illustrates exemplary reference and real currents over time according to embodiments of the present disclosure.
FIG. 4C illustrates exemplary converter output voltage over time according to embodiments of the present disclosure.

FIG. 4A illustrates an exemplary current control over time according to operation of the embodiments of the present disclosure. FIG. 4B illustrates an exemplary reference and real currents over time according to operation of the embodiments of the present disclosure. FIG. 4C illustrates exemplary converter output voltage over time according to operation of the embodiments of the present disclosure.

In FIG. 4B the reference current $I_{REF}$ and real current $I_{REAL}$ in an RL-load (see FIG. 1; 106) are presented together with five positive (HB1-HB5) and five negative (LB1-LB5) hysteresis boundaries (see Table 3 and FIG. 4A also), equally distributed between $I_{REF}$−ΔI and $I_{REF}$+ΔI and separated by ΔI/5 from each other. The current control error $I_{ERROR}$, as a difference between $I_{REAL}$ and $I_{REF}$, and the converter output voltage $V_{OUT}$ are presented in FIGS. 4A and 4C, respectively.

The initial status of $V_{OUT}$ in the considered time window (from 23.06 ms) was set previously by the control system at +4 VDC (where VDC-80V in simulation model). At this voltage level the current $I_{REAL}$ is rising up, and when $I_{ERROR}$ hits the first hysteresis boundary LB1 at point A (level−ΔI/5 in FIG. 4A), the output state of the first hysteresis block 302 is changed from "1" to "0", hence a sum at the output of Sum2 block 307 is reduced by one from "6" to "5" (FIG. 3), and, according to look-up table 308 in FIG. 3 for di/dt>0, the voltage $V_{OUT}$ becomes +3 VDC.

From the beginning of the considered time window to time t1 (FIG. 4C), the current $I_{REF}$ has a positive di/dt value and the hysteresis controller (see FIG. 5; 500) shall operate with voltage levels presented in the second column of look-up table 308 in FIG. 3 (di/dt>0). Starting from t1 the di/dt sign of current $I_{REF}$ is negative, but the hysteresis controller remains operating as for positive di/dt until time t2, when $I_{ERROR}$ hits a fifth hysteresis boundary LB5, where all of the hysteresis blocks 302, 303, 304, 305 and 306 have been changed from "1" to "0", and, hence, a sum at the output of Sum2 block 307 is reduced to "1". This event will switch an operation of the hysteresis controller to the first column of the table 308 for di/dt<0. In other words, and as it was mentioned above, a sign of di/dt can be determined as negative at the moment in time (t2) when the output of Sum2 block 307 reaches a value of "1" (and will be changed to a positive when the output of Sum2 block 307 becomes equal to "6"). This logic is implemented in a di/dt estimator block (see FIG. 5; 700), which is described below.

While $V_{OUT}$ is at its maximum negative level −4 VDC from time t2, the current $I_{REAL}$ is decreasing (FIG. 4B) and when it hits point F, which corresponds to the first hysteresis boundary HB1 in FIG. 4A, the output state of the first hysteresis block 302 is changed from "0" to "1", hence a sum at the output of Sum2 block 307 is increased by one from "1" to "2" (FIG. 3). And according to look-up table 308 in FIG. 3 for di/dt<0, the voltage $V_{OUT}$ becomes −3 VDC. At point G, when $I_{REAL}$ and $I_{ERROR}$ reach the second hysteresis boundary HB2, the output of Sum2 block 307 is incremented again and $V_{OUT}$ becomes −2 VDC.

According to one embodiment, maximum current error ΔI takes place only at the points where di/dt value of the reference current $I_{REF}$ changes a sign. Beyond these critical points, the method works in such a way to minimize the current error $I_{ERROR}$ at ΔI/5 as fast as possible at given parameters of the load.

Figure 5:
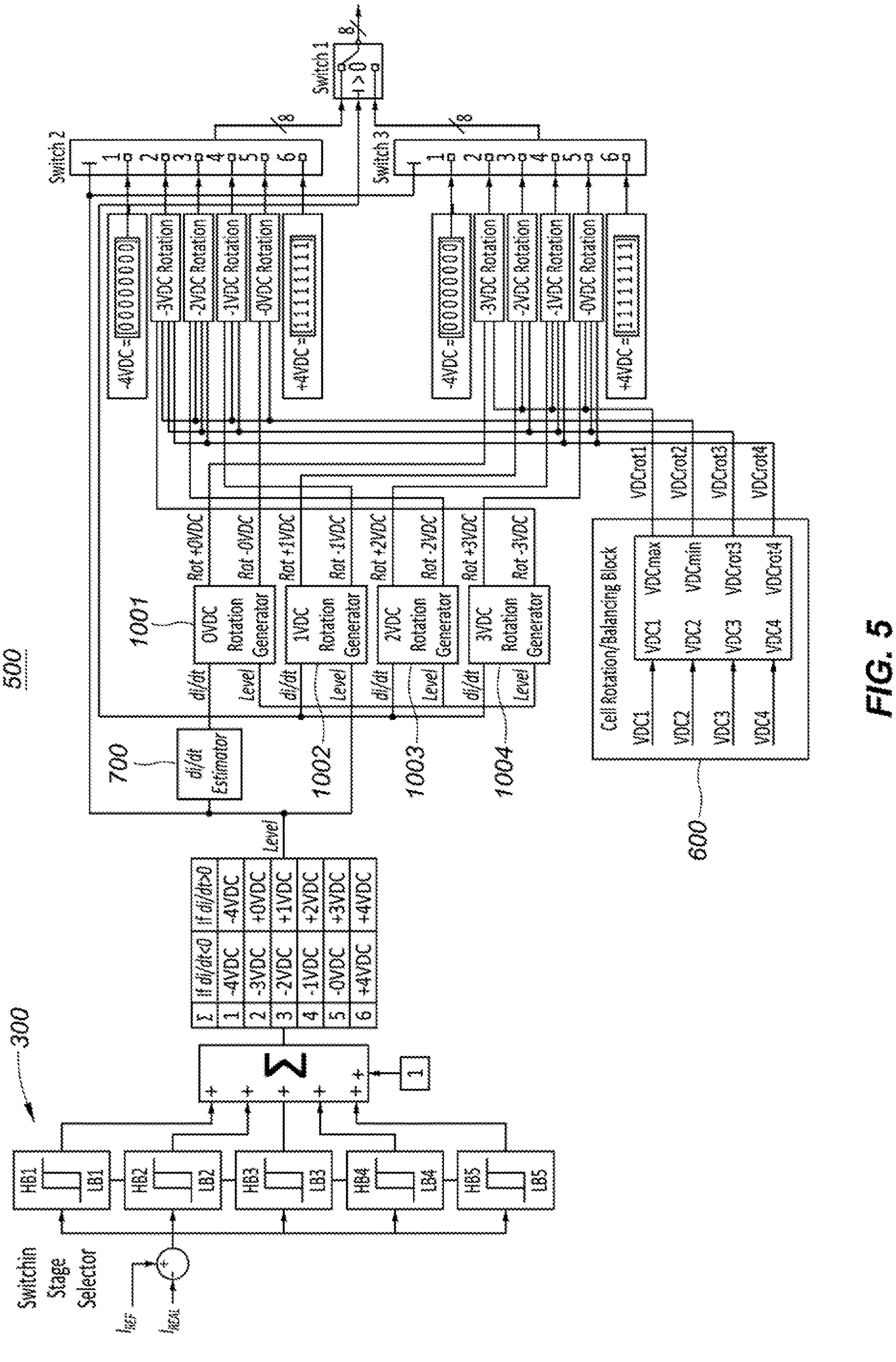
FIG. 5 illustrates a functional diagram of a multi-level multi-quadrant hysteresis current controller with DC Voltage balancing and Zero State rotation according to embodiments of the present disclosure.

FIG. 5 illustrates a functional diagram of a multi-level multi-quadrant hysteresis current controller 500 with DC voltage balancing and zero state rotation according to embodiments of the present disclosure. The controller 500 comprises the switch state selector 300, which functions were described in detail with regard to FIG. 3. The output signal of Sum2 block 307 in FIG. 3 is named as "Level" in FIG. 5. This signal represents a numerical value for general level (from 1 to 6) of the nine-level hysteresis controller 500, which is used further in the method to select an appropriate output voltage level of the converter 107 and 207 (see FIGS. 1A and 2A).

According to the look-up table 308 in FIG. 3, knowledge of the sign of di/dt is required to choose an appropriate output voltage level. As was mentioned in previous sections herein, a sign of di/dt can be determined as negative at the moment when the "Level" reaches a value of "1", and will be changed to a positive when the "Level" becomes equal to "6". This logic is implemented in di/dt estimator block 700, shown in FIG. 7.

As discussed above and presented in Table 1, there are many switching states available for each voltage level of a nine-level converter, with the exception of ±4 VDC, when all cells are involved in providing a maximum positive or negative output voltage. Thus, the following tasks are resolved to control the current in the load while taking into account that the hysteresis "Level" and a sign of di/dt are already known parameters.

Task 1: This task, which is based on the voltages on DCL (DC-link) capacitors 114 and 214 of each cell, results in an identification, respectively, of the cell which has to be switched for some period of time to provide the required output voltage level and regulation of output current. This identification method ensures a balancing of the voltages on the DCL capacitors (or batteries) 114 and 214 during an operation of the converter 107 and 207. When this is provided, the energy, which is stored in the DCL capacitors or batteries 114 and 214, or transferred from or to the source via the DCL capacitors 114 and 214, is equally distributed among all cells. This preferred condition advantageously provides the most effective operation of the multi-level converter 107 and 207, where each cell has to be designed for a specific temperature profile of the semiconductor switches based on their operational regimes. This task is performed by an exemplary DC voltage balancing or cell rotation/balancing block 600 (see FIG. 5) in the present method, and its functional diagram is presented in FIG. 6.

Task 2: For the cell, identified by the DC voltage balancing block 600*a* rotation of zero switching state is preferred. This rotation provides a distribution of energy among the switches within a specific cell in operation. There are two possible combinations of switching to provide a zero voltage at the output of a cell, as shown in Table 1 (and FIGS. 8A and 8B). The rotation method alternates the switches used to provide a zero voltage with every second positive or negative operational level of the cell. This rotation reduces twice the switching frequency of the switches in comparison with output voltage frequency of the cell and the entire converter. There are four rotation generator blocks in the present method for different levels of output voltage from 0 VDC to 3 VDC, which are presented in FIG. 10 (see 1001-1004).

Figure 6:
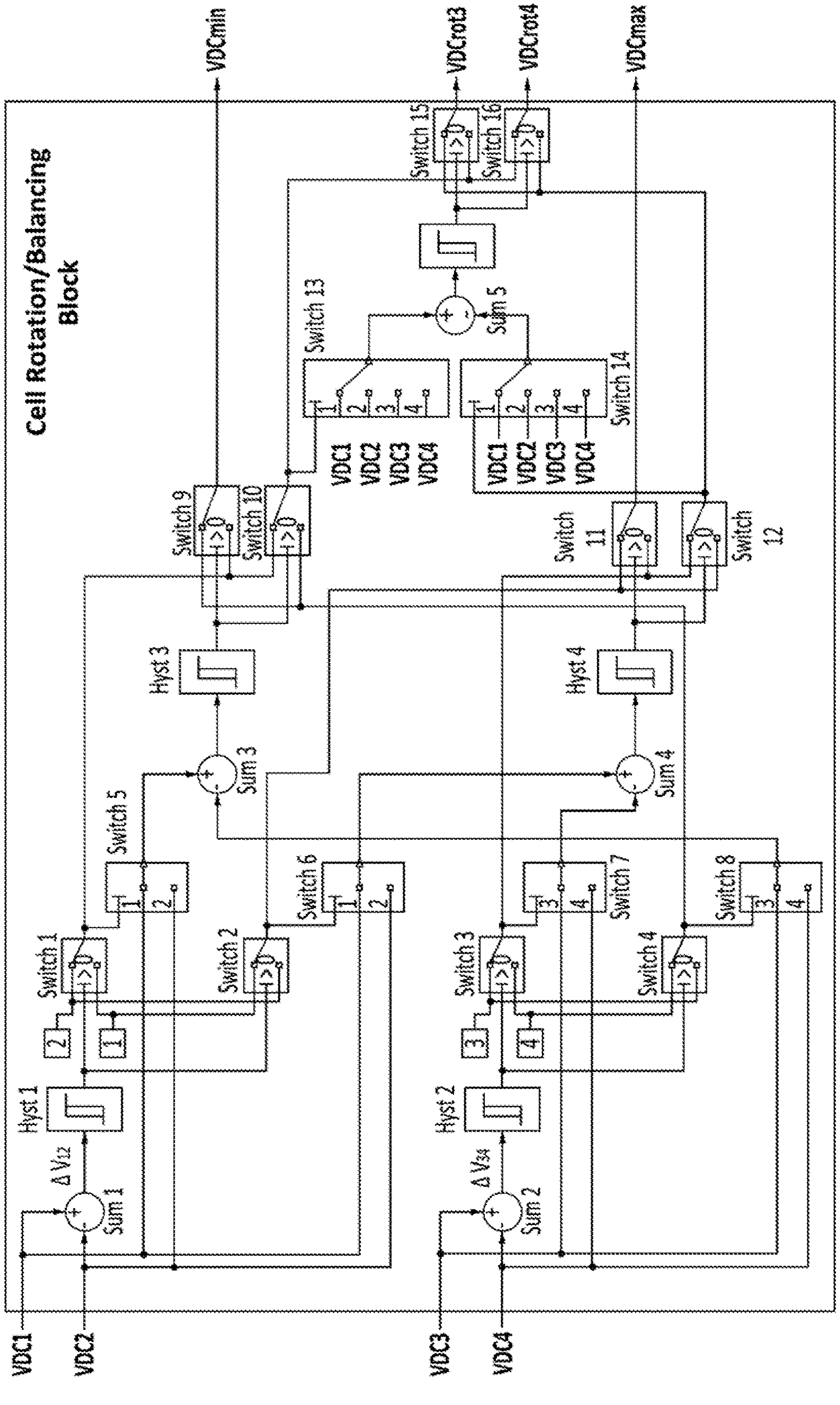
FIG. 6 illustrates an exemplary cell rotation/balancing block according to embodiments of the present disclosure.

FIG. 6 illustrates an exemplary cell rotation/balancing block 600 according to embodiments of the present disclosure. The inputs of this block 600 are the measured voltages VDC1, VDC2, VDC3, and VDC4 on the DCL capacitors (batteries) 114 and 214 of all four cells. The output signals are the numbers of cells (from 1 to 4) with a maximum DCL voltage VDCmax, minimum voltage VDCmin, and then VDCrot3 and VDCrot4, distributed as follows: VDCmin<VDCrot4<VDCrot3<VDCmax. In the beginning, VDC1 and VDC2 are compared with each other and if their difference $\Delta V_{12}$ is higher or lower than positive or negative threshold of hysteresis block Hyst 1, then the output of this block is set to "1" or "0" respectively, otherwise it maintains its previously set value at the output. This threshold helps ignore a noise of a certain level in the feedback signal and regulates how often a rotation of cells should occur. Based on Hyst 1 output signal, Switch 1 chooses a number of cell (1 or 2) with a higher VDC voltage and Switch 5 passes its corresponding voltage value to Sum 3, which compares it with a lowest voltage of VDC3 and VDC4, which go through the same comparison technique. Thus at the output of cell rotation controller the cell numbers are distributed in accordance to their VDC voltages as VDCmin<VDCrot4<VDCrot3<VDCmax. Before going to rotation blocks signals VDCmax and VDCmin are reassigned to VDCrot1 and VDCrot2 in DC voltage balancing block (see FIG. 5) taking into account a sign of reference current $I_{REF}$. If the current $I_{REF}$ is positive, corresponding to an energy transferring from DCL capacitors 114 and 214 to the load 106 and 206, then the cell with a maximum DCL voltage participates in a rotation of all positive output voltage levels (but not at the same time). This will cause a faster discharge of this cell with a maximum DCL voltage, because at positive output voltage and positive load current there is only one way for energy to be transferred: from DCL capacitors 114 and 214 to the load 106 and 206. At the same time, at positive output current (or $I_{REF}$) the cell with a minimum DC voltage has to participate in providing the negative output voltage levels only, to charge up its DCL voltage as soon as possible. That is, because at positive load current but negative output voltage of the converter, there is only one direction for energy transfer: from the load (reactive load) 106 and 206 to DCL capacitors (or batteries) 114 and 214.

According to an exemplary two quadrant multi-level embodiment, the cell with a maximum DCL voltage participates in a rotation of all positive output voltage levels (but not at the same time). This will cause a faster discharge of this cell with a maximum DCL voltage, because at positive output voltage and positive load current there is only one way for energy to be transferred: from DCL capacitor 214 to the load 206. At the same time, the cell with a minimum DC voltage has to participate in providing the negative output voltage levels only, to charge up its DCL voltage as soon as possible. That is, because at positive load current but negative output voltage of the converter, there is only one direction for energy transfer: from the load (reactive load) 206 to DCL capacitors (or batteries) 214.

Figure 7:
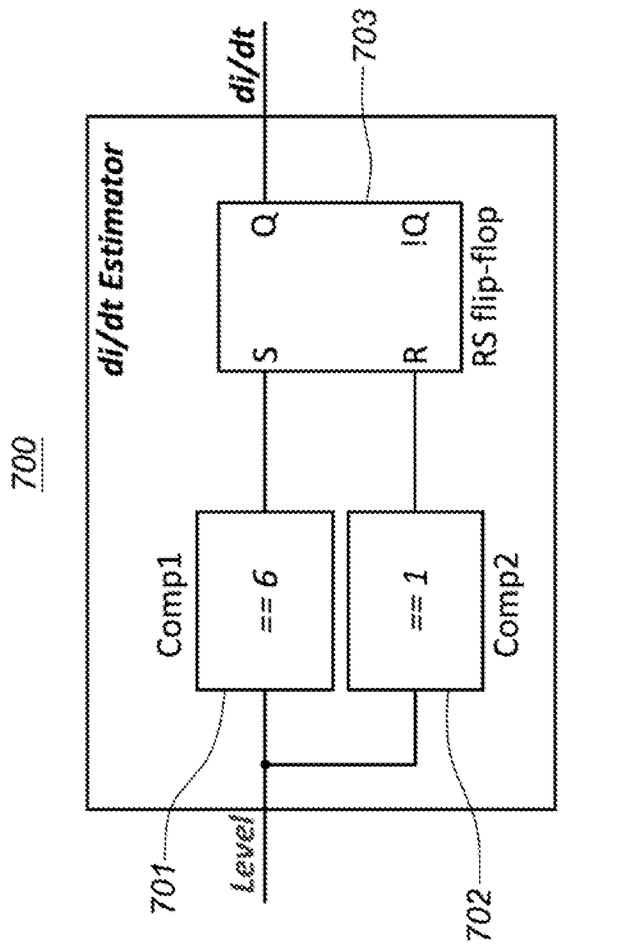
FIG. 7 illustrates an exemplary di/dt estimator according to embodiments of the present disclosure.

FIG. 7 illustrates an exemplary di/dt estimator block 700 according to embodiments of the present disclosure. The di/dt estimator block 700 comprises two digital comparators (Comp 1 701 and Comp 2 702) and an RS flip-flop element 703. Both comparators 701 and 702 provide transition pulses from "false" to "true" at the moments when "Level" signal is equal to "6" (Comp 1 701) and "1" (Comp 2 702). These rising edges are detected by RS flip-flop 703, which changes its output state accordingly: providing a "true" signal at its non-inverting output Q when di/dt>0, and "false" signal when di/dt<0.

Figure 8A:
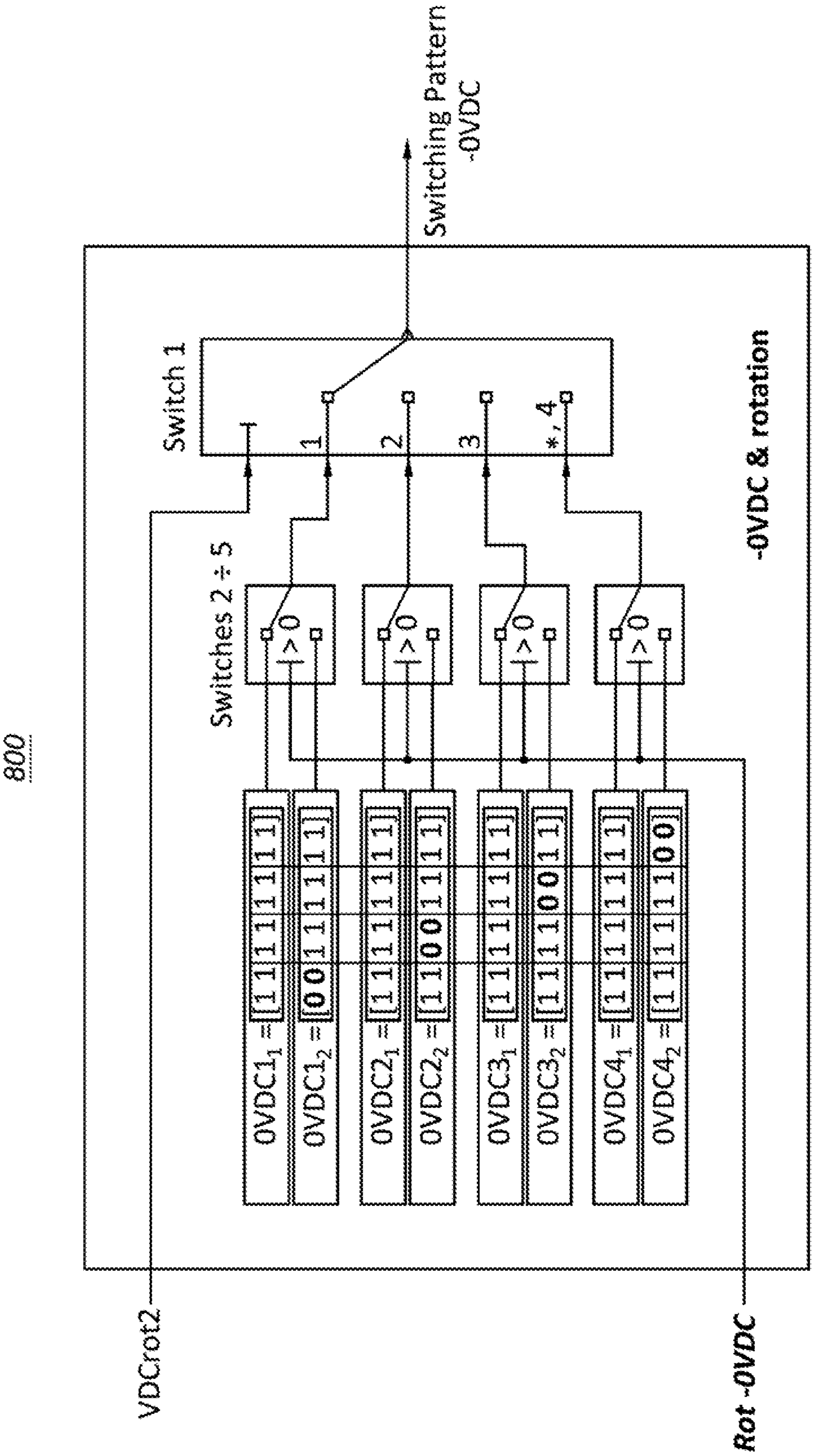
FIG. 8A illustrates a functional diagram of an exemplary −0 VDC rotation block according to embodiments of the present disclosure.
Figure 8B:
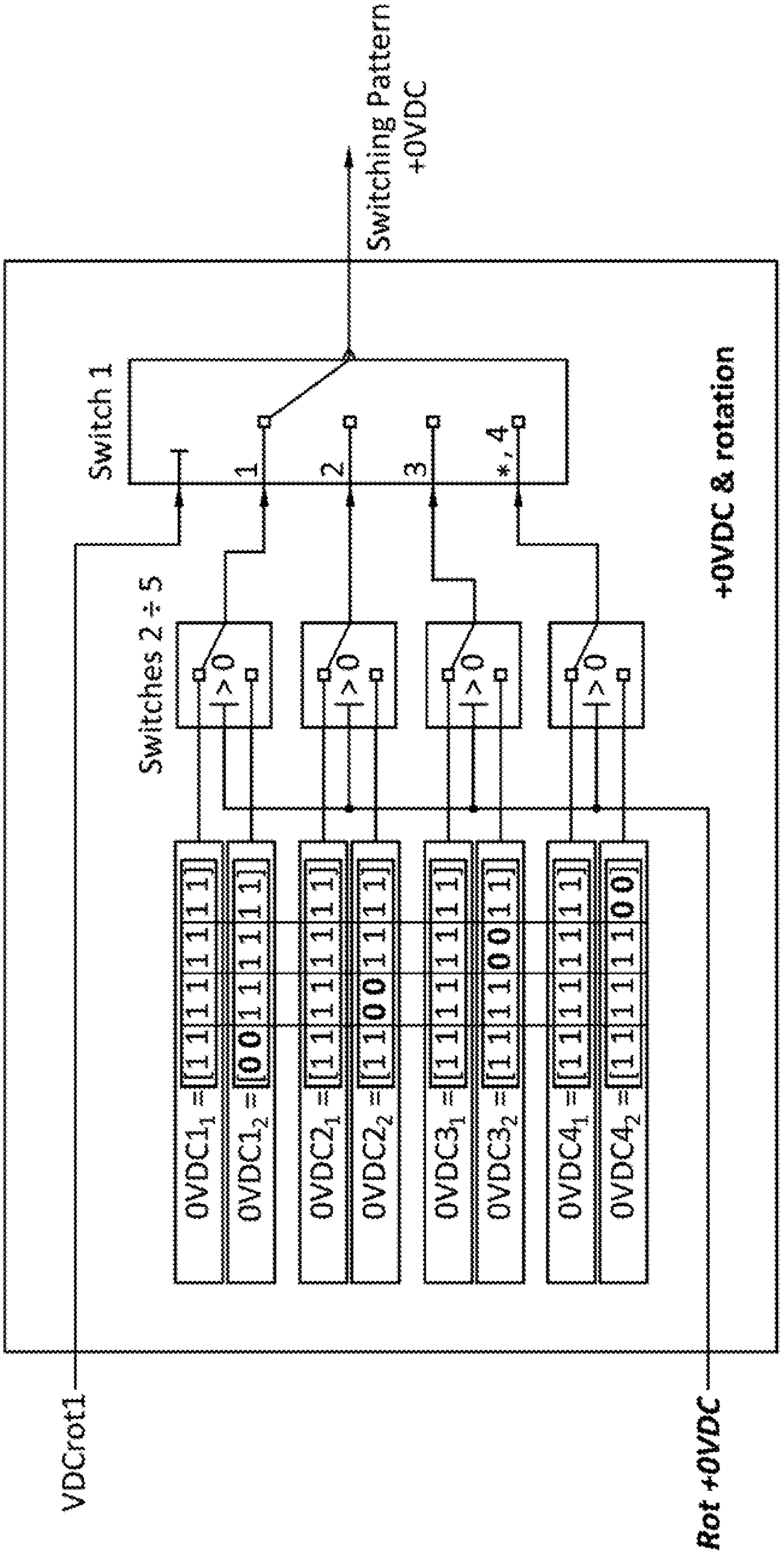
FIG. 8B illustrates a functional diagram of an exemplary +0 VDC rotation block according to embodiments of the present disclosure.

FIG. 8A illustrates a functional diagram of an exemplary −0 VDC rotation block 800 according to embodiments of the present disclosure. FIG. 8B illustrates a functional diagram of an exemplary +0 VDC rotation block 810 according to embodiments of the present disclosure.

A −0 VDC rotation block 800 receives one control signal from DC voltage balancing block VDCrot2, as well as one signal Rot −0 VDC from a 0 VDC rotation generator, and provides the control signals S1-S16 for switching elements of the nine-level converter 107 and 207 for −0 VDC output voltage, where −0 means that 0 VDC level is following after and/or before −VDC level. The multiplexer Switch 1 chooses one of four different combinations of switching signals from Switches 2-5, based on input VDCrot2 signal, indicating which cell is operating at the same time in providing-VDC output level. This means that a rotation of zero switching state has to be performed for this specific cell (with VDCrot2 number).

A +0 VDC rotation block 810 receives one control signal from DC voltage balancing block VDCrot1, as well as one signal Rot +0 VDC from a 0 VDC rotation generator, and provides the control signals S1-S16 for switching elements of the nine-level converter 107 and 207 for +0 VDC output voltage, where +0 means that 0 VDC level is following after and/or before +VDC level. The multiplexer Switch 1 chooses one of four different combinations of switching signals from Switches 2-5, based on input VDCrot1 signal, indicating which cell is operating at the same time in providing +VDC output level. This means that a rotation of zero switching state has to be performed for this specific cell (with VDCrot1 number).

For an exemplary four quadrant multi-level embodiment, the input signal Rot +0 VDC controls a sequence of switching between two possible zero states [1 1] and [0 0] for the same cell.

For an exemplary two quadrant multi-level embodiment, the input signal Rot +0 VDC controls a sequence of switching between two possible zero states [1 0] and [0 1] for the same cell.

Figure 9A:
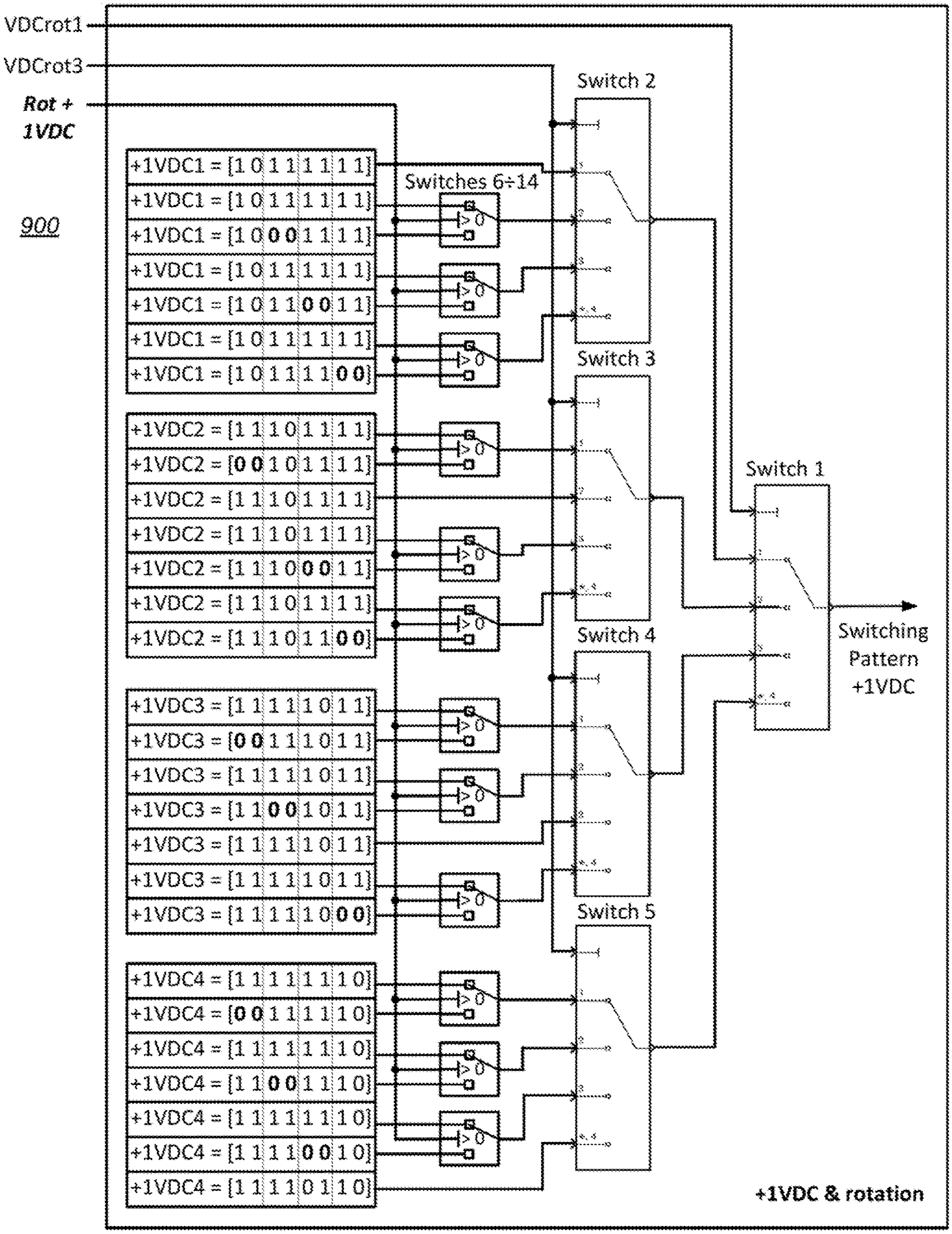
FIG. 9A illustrates a functional diagram of an exemplary +1 VDC rotation block according to embodiments of the present disclosure.
Figure 9B:
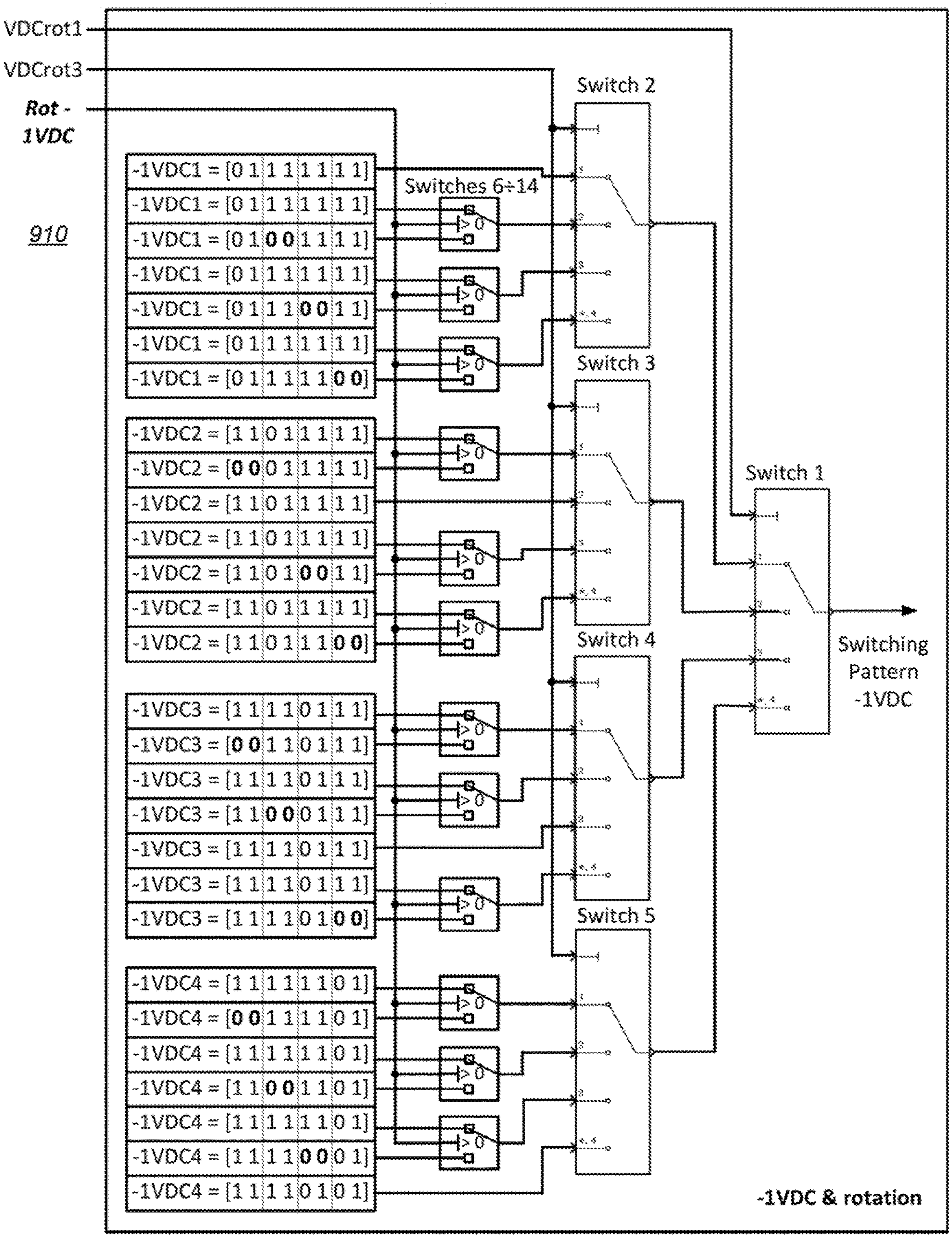
FIG. 9B illustrates a functional diagram of an exemplary −1 VDC rotation block according to embodiments of the present disclosure.

FIG. 9A illustrates a functional diagram of an exemplary +1 VDC rotation block 900 according to embodiments of the present disclosure. FIG. 9B illustrates a functional diagram of an exemplary −1 VDC rotation block 910 according to embodiments of the present disclosure.

A +1 VDC rotation block 900 has a more complicated structure than those depicted in FIGS. 8A and 8B. Besides the control signal Rot +1 VDC coming from 1 VDC rotation generator block, the block 900 receives two control signals VDCrot1 and VDCrot3 from the DC voltage balancing block. The first signal, VDC1rot, is used by the multiplexer Switch 1 to set up a positive voltage at the output of the cell, which number is specified by this signal. This can be done by providing the switching combination [1 0] for that cell. The other three cells must provide a zero switching state. If at the output of the converter 107 and 207 the voltage is changing between +0 VDC and +1 VDC, then the signal Rot+1 VDC is always "true" and there is no rotation of zero switching state for other three cells. If the output voltage is varying between +1 VDC and +2 VDC, then a rotation of zero state has to be performed for only one specific cell which is involved in producing of +2 VDC level.

For an exemplary four quadrant multi-level embodiment, the input signal Rot+1 VDC controls a sequence of switching between two possible zero states [1 1] and [0 0] for that cell.

For an exemplary two quadrant multi-level embodiment, the input signal Rot+1 VDC controls a sequence of switching between two possible zero states [1 0] and [0 1] for that cell.

A −1 VDC rotation block 910 receives the control signal Rot−1 VDC coming from 1 VDC rotation generator block, and two control signals VDCrot2 and VDCrot3 from DC voltage balancing block. The first signal, VDC2rot, is used by the multiplexer Switch 1 to set up a negative voltage at the output of the cell, which number is specified by this signal. This can be done by providing the switching combination [0 1] for that cell. The other three cells must provide a zero switching state. If at the output of the converter 107 and 207 the voltage is changing between −0 VDC and −1 VDC, then the signal Rot−1 VDC is always "true" and there is no rotation of zero switching state for other three cells. If the output voltage is varying between −1 VDC and −2 VDC, then a rotation of zero state has to be performed for only one specific cell which is involved in producing of −2 VDC level.

Not shown herein, +2 VDC rotation blocks and +3 VDC rotation blocks have a complex structure with four input signals, where three of them VDCrot1, VDCrot2 and VDCrot3 are coming from a DC voltage balancing block and one signal is either from a 2 VDC rotation generator or a 3 VDC rotation generator that is intended to control a sequence of changing between zero switching states for the specific cell.

Figure 10A:
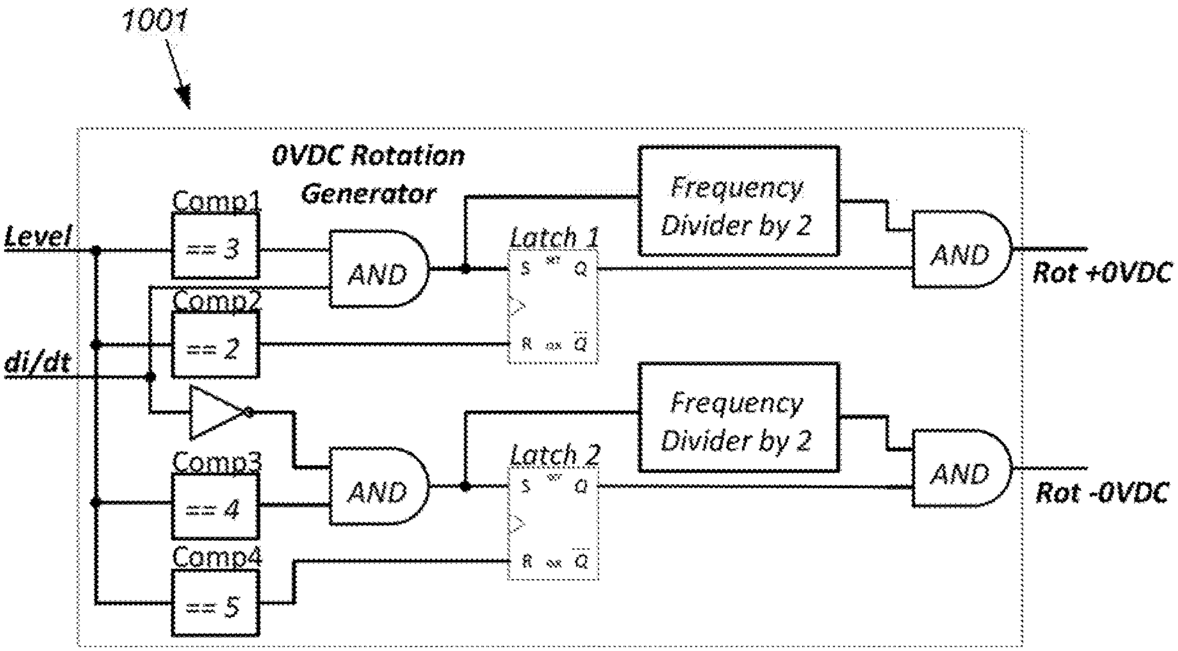
FIG. 10A illustrates an exemplary 0 VDC rotation generator according to embodiments of the present disclosure.
Figure 10B:
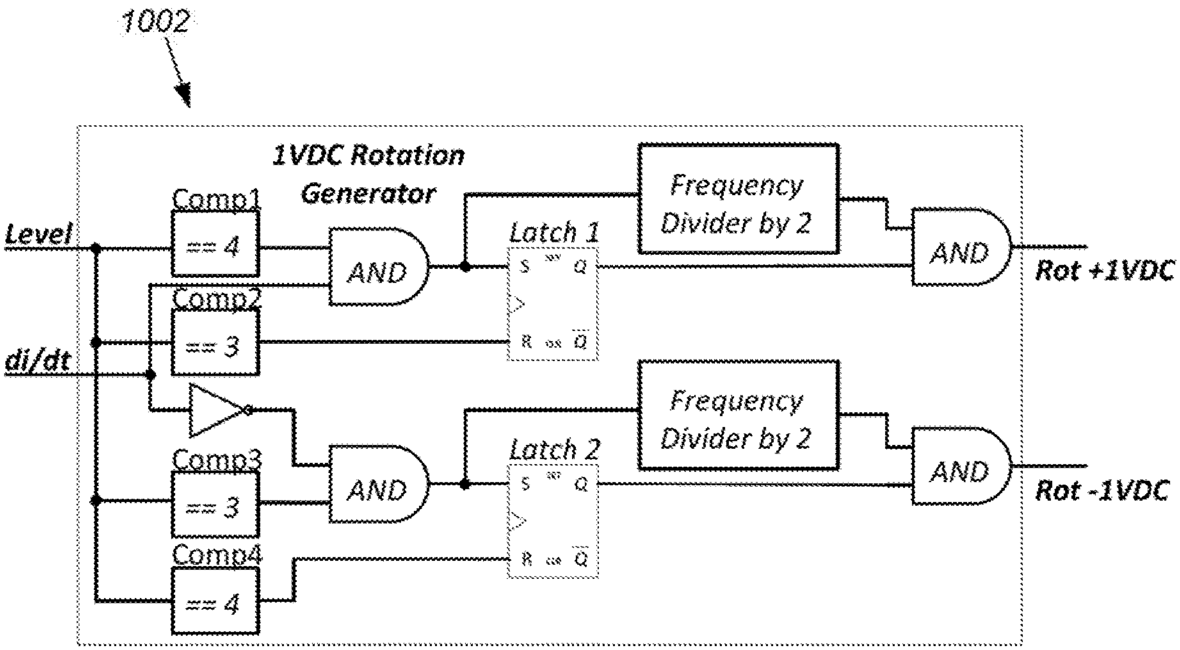
FIG. 10B illustrates an exemplary 1 VDC rotation generator according to embodiments of the present disclosure.
Figure 10C:
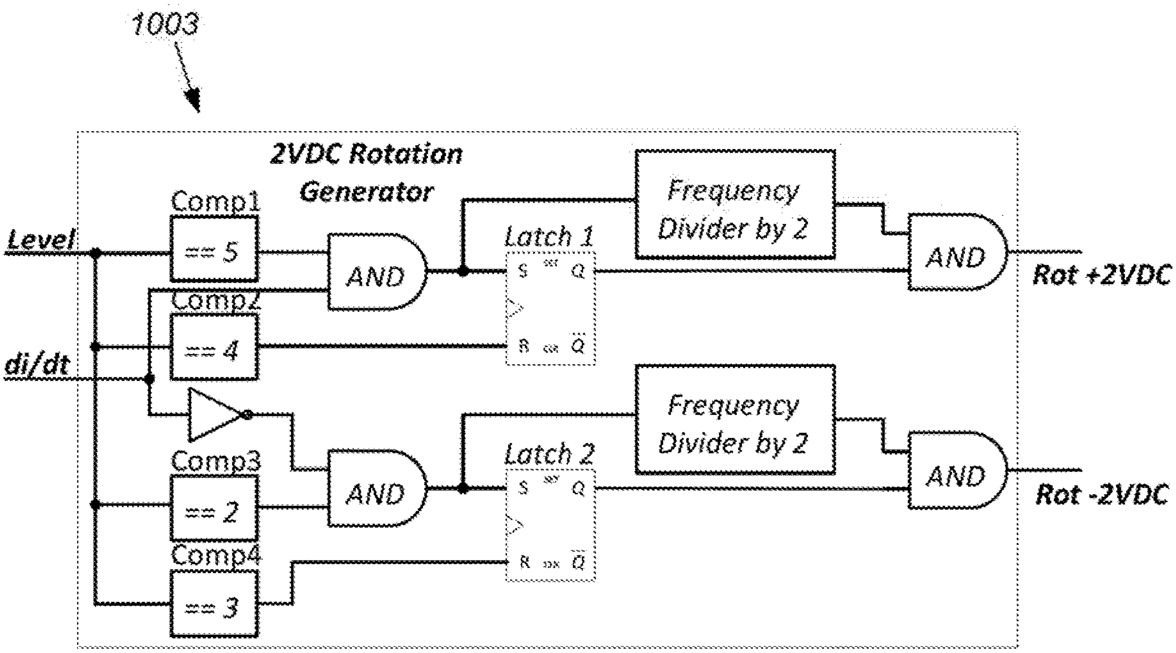
FIG. 10C illustrates an exemplary 2 VDC rotation generator according to embodiments of the present disclosure.
Figure 10D:
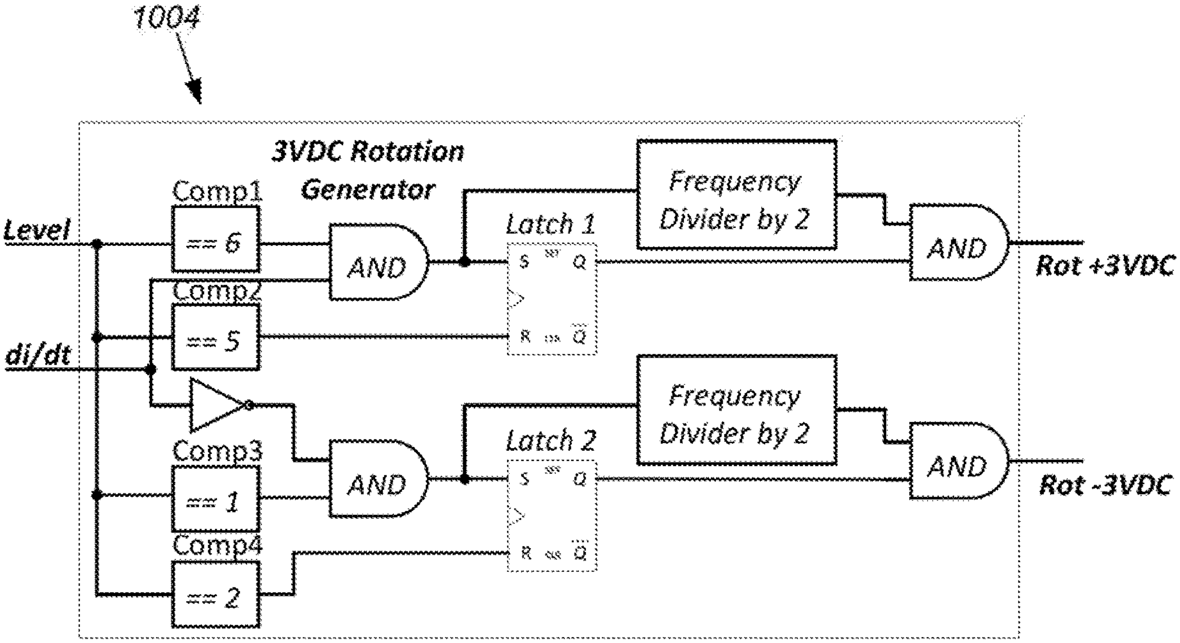
FIG. 10D illustrates an exemplary 3 VDC rotation generator according to embodiments of the present disclosure.

FIG. 10A illustrates an exemplary 0 VDC rotation generator 1001 according to embodiments of the present disclosure. FIG. 10B illustrates an exemplary 1 VDC rotation generator 1002 according to embodiments of the present disclosure. FIG. 10C illustrates an exemplary 2 VDC rotation generator 1003 according to embodiments of the present disclosure. FIG. 10D illustrates an exemplary 3 VDC rotation generator 1004 according to embodiments of the present disclosure.

Figure 10E:
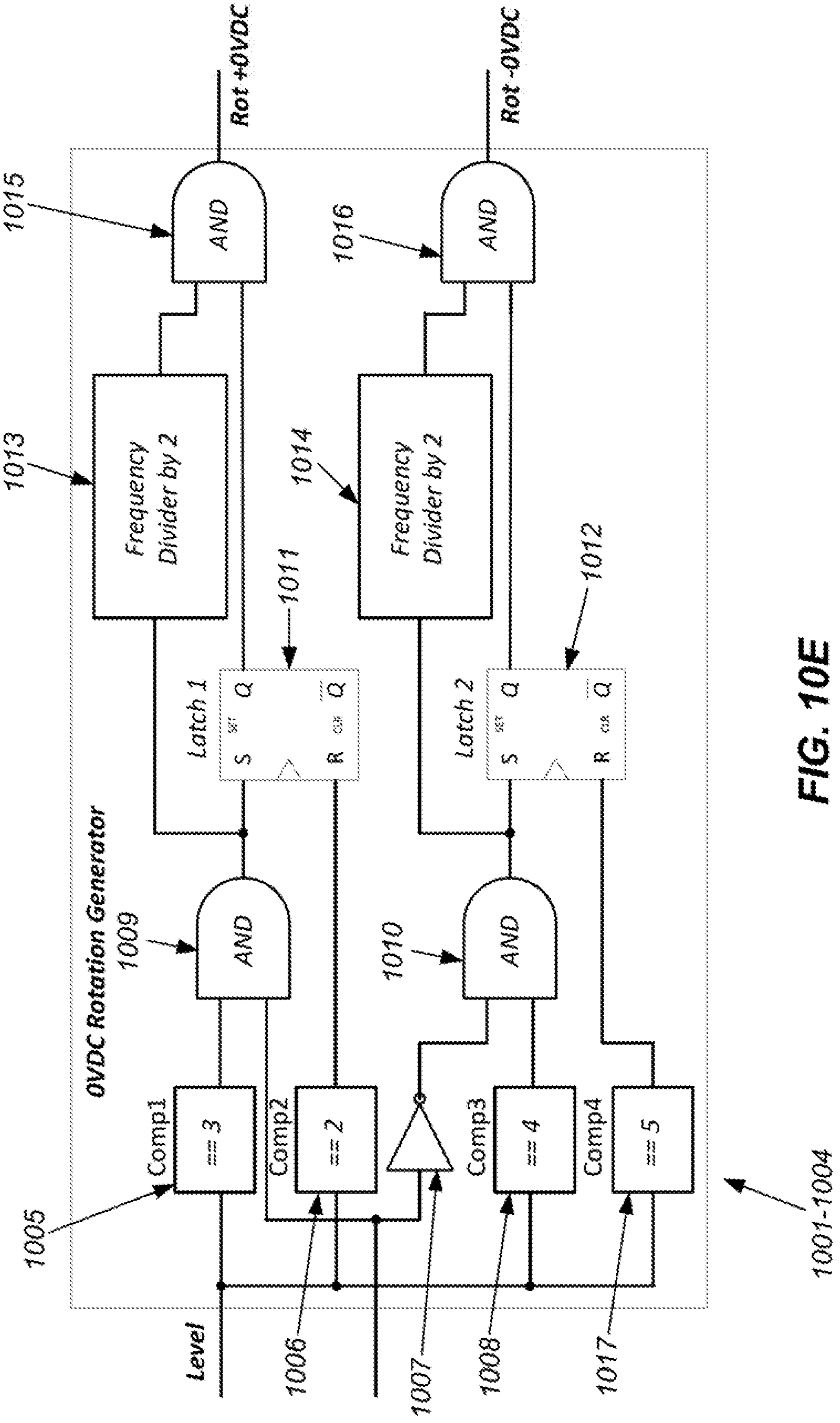
FIG. 10E illustrates an exemplary 0 VDC rotation generator according to embodiments of the present disclosure.

FIG. 10E illustrates an exemplary 0 VDC rotation generator according to embodiments of the present disclosure.

Each of the four rotation generators in FIGS. 10A-10E consists of: four digital comparators 1005, 1006, 1008, and 1017, one inverting element 1007, four logic elements AND 1009, 1010, 1015, and 1016, two SR flip-flops Latch 1 1011 and Latch 2 1012 and two frequency dividers by 2 1013 and 1014. The structure and operational principle of all rotation generator blocks is the same; the difference being the preset values of digital comparators only. The following is an exemplary review of an operation of 0 VDC rotation generator 1001. When "di/dt" signal from di/dt Estimator output is "true", the comparator Comp1 1005 will set SR flip-flop Latch 1 1011 output at "true" when the "Level" signal is equal to "3", which corresponds to +1 VDC of output voltage level. Another comparator Comp2 1006, at positive di/dt will reset Latch 2, when the "Level" signal is equal to "2", which corresponds to +0 VDC of output voltage level. In other words, a high level of pulse train at the output of Latch 1 will correspond to +1 VDC voltage at the output of the nine-level converter, while its zero level will indicate +0 VDC voltage level (+0 indicates that 0 VDC level is following after and/or before +VDC level). Finally, the circuit included the frequency divider blocks 1013 and 1014 and logic element AND 1015 and 1016 is intended to set the output signal Rot+0 VDC at "true" with a high level of Latch 1 output, which happens at +1 VDC output voltage level, and maintains this "true" signal until a second transition from +0 VDC to +1 VDC occurs. Such the output signal Rot+0 VDC is used to alternate two possible zero state switching combinations for the cell in operation of providing +1 VDC voltage level. The same operational logic is behind the Rot −0 VDC signal, which is generated by the same 0 VDC rotation generator 1001 to alternate two zero state switching combinations for the cell in operation of providing −1 VDC voltage level.

Simulation results for multi-level cascaded converters according to embodiments of the present disclosure are presented in FIGS. 11-14B.

Figure 11A:
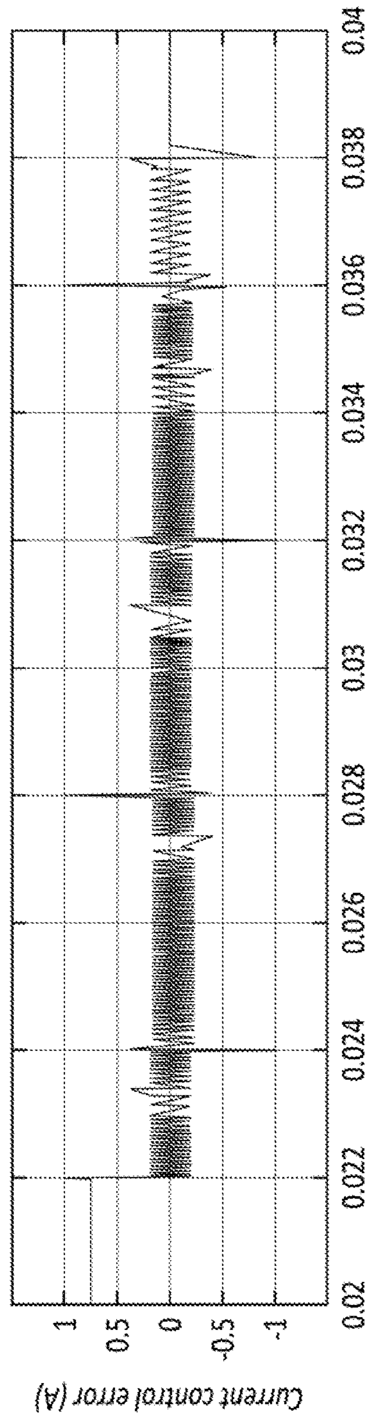
FIG. 11A illustrates exemplary simulated current control over time according to embodiments of the present disclosure.
Figure 11B:
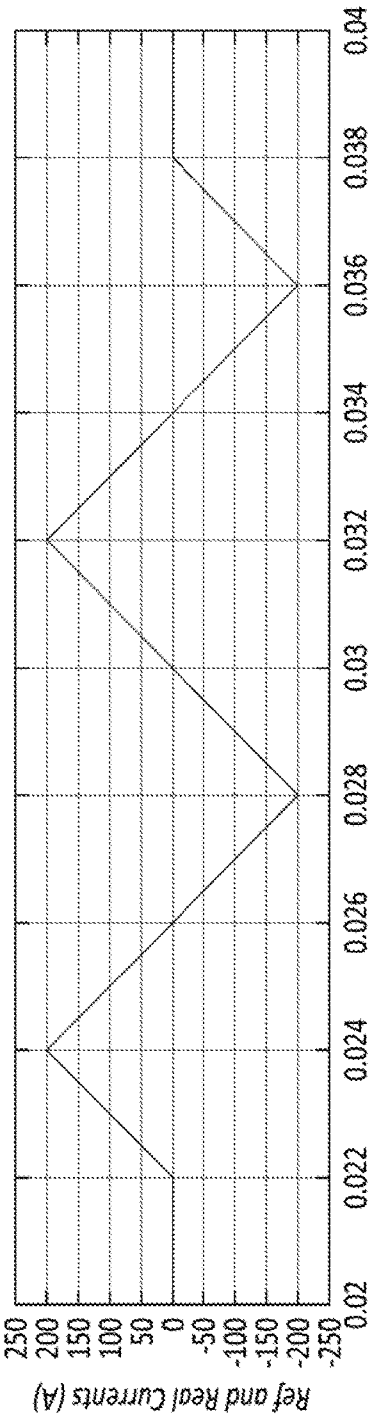
FIG. 11B illustrates exemplary simulated reference and real currents over time according to embodiments of the present disclosure.
Figure 11C:
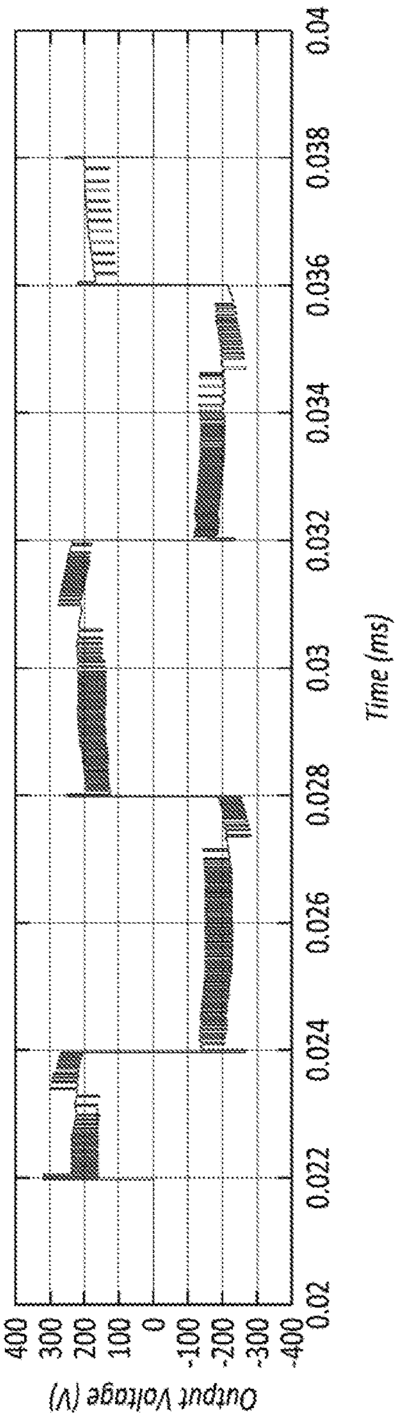
FIG. 11C illustrates exemplary simulated converter output voltage over time according to embodiments of the present disclosure.

FIG. 11A illustrates exemplary simulated current control error over time according to embodiments of the present disclosure. FIG. 11B illustrates exemplary simulated reference and real currents over time according to embodiments of the present disclosure. FIG. 11C illustrates exemplary simulated converter output voltage over time according to embodiments of the present disclosure.

FIG. 11B illustrates a reference triangle current $I_{REF}$ and real current $I_{REAL}$, which follows $I_{REF}$ with a current control error $I_{ERROR}$ presented in FIG. 11A. An amplitude of the reference current $I_{REFm}$=195 A. The voltage at the output of a multi-level converter, created by the disclosed hysteresis control technique, is shown in FIG. 11C, where each output level corresponds to DCL voltage on capacitor bank of one cell VDC=80V (and as it is shown in FIG. 11C, DCL voltages of all cells are balanced with a minimum preset error value of ±5V, so they can be considered equal). As can be seen from $I_{ERROR}$ waveform, its maximum value is limited by a preset value of ΔI=1A and this maximum error is observed only at the points where di/dt value of the reference current $I_{REF}$ changes a sign (peaks of triangle waveform). Beyond these critical points, the method works in such a way to minimize the current error $I_{ERROR}$ at ΔI/5=0.2 A as fast as possible at given parameters of the load.

Figure 12:
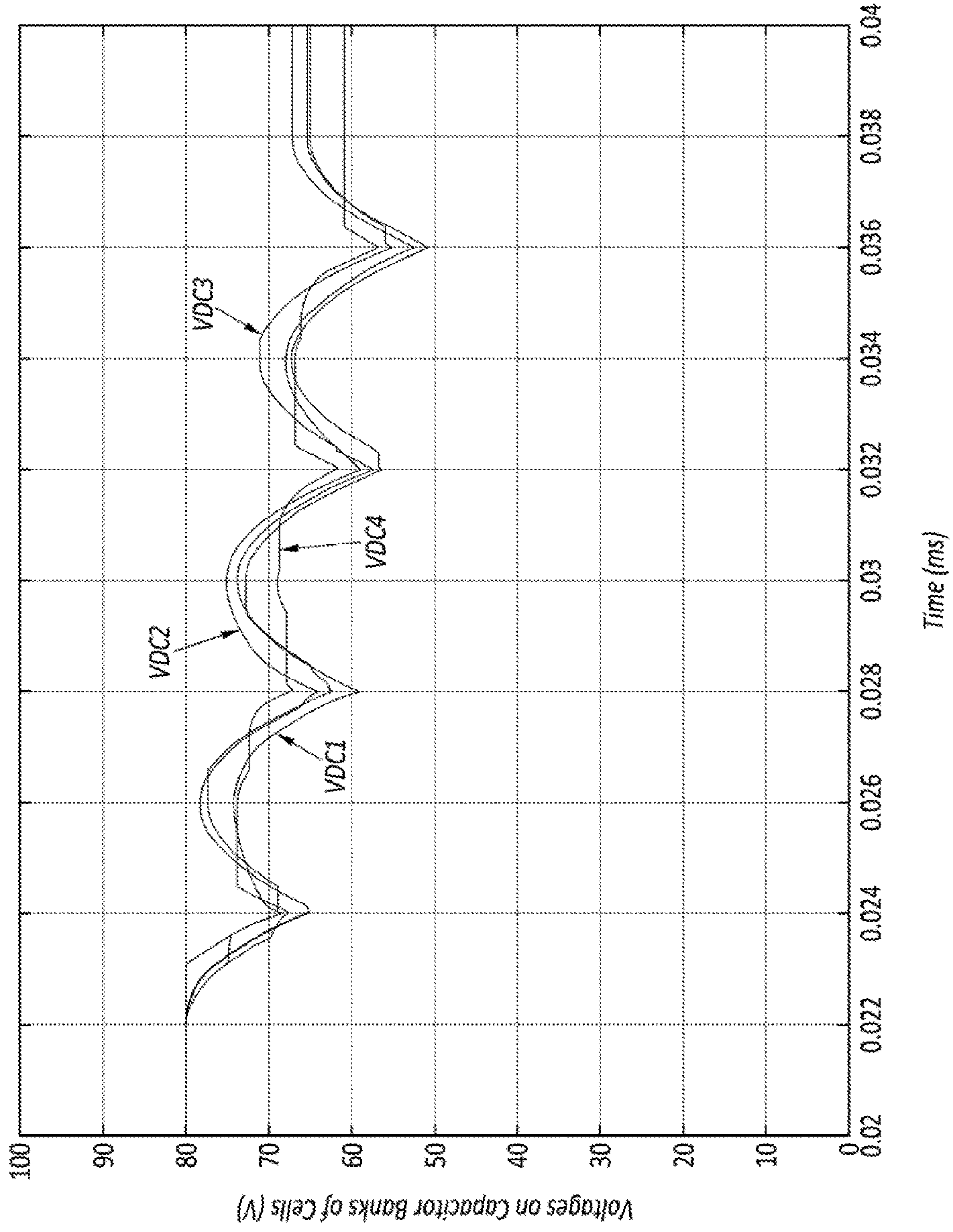
FIG. 12 illustrates exemplary voltages on storage elements of cells to embodiments of the present disclosure.

FIG. 12 illustrates exemplary DCL voltages on storage elements (capacitors) of each cell according to embodiments of the present disclosure. In the simulated circuit there is no source of voltage support on the capacitors. Thus even if the power flow is going back and forth from the inductive load to the capacitors (through individual cells) creating AC voltage pulsations on them, the DC-components of the capacitor voltages are reducing with time because of the active losses in the switches and in the load resistance. This can be seen from FIG. 12 also, where the initial DCL voltage for all cells is VDC=80V, but at the end of converter's operation cycle this value is reduced to 65V (average value). Furthermore, an error of DC voltage balancing method, which is a maximum difference between any two DCL voltages at any moment of time, does not exceed a preset value of 10V.

Figure 13A:
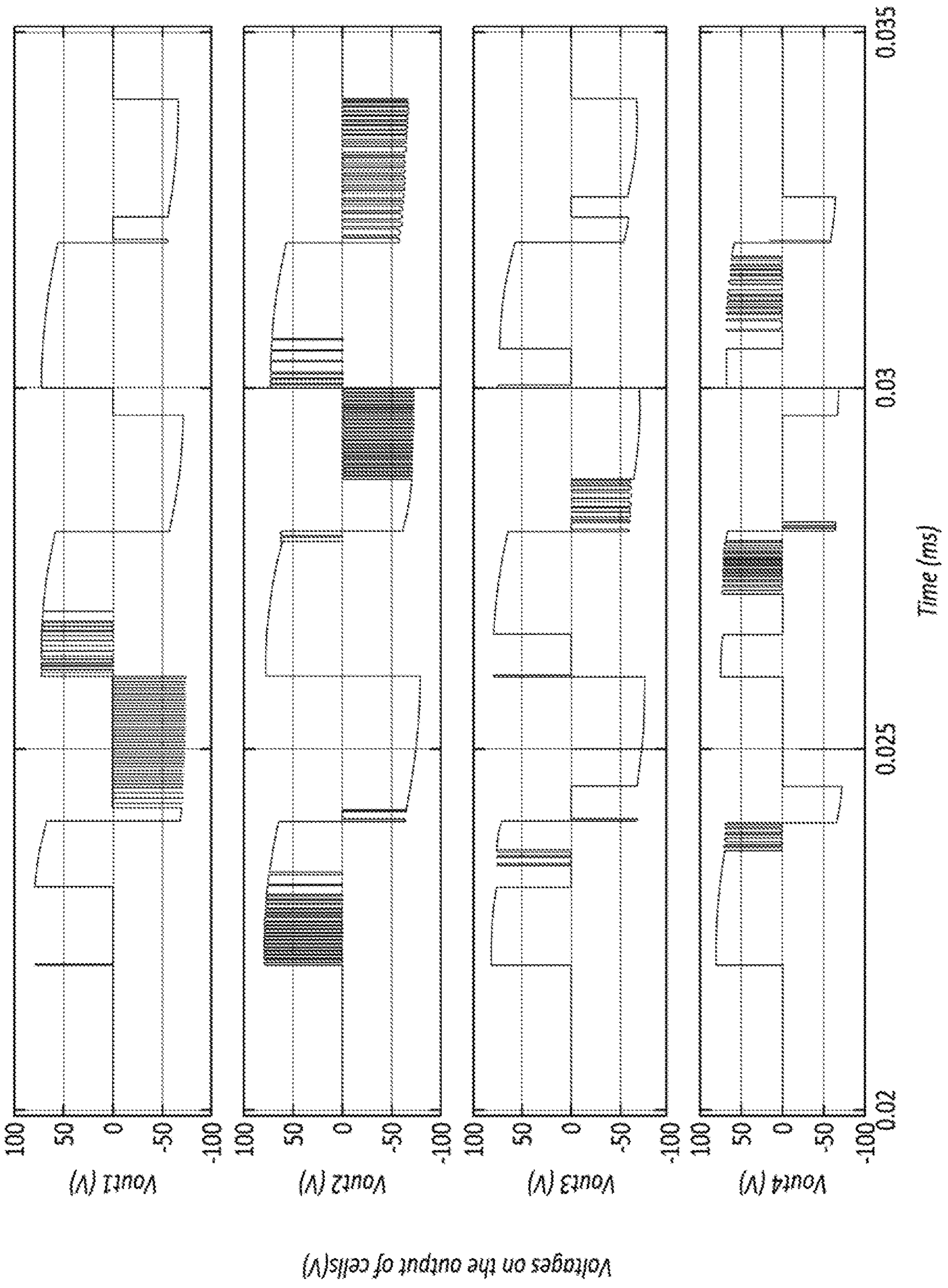
FIG. 13A illustrates output voltage of four exemplary cells according to embodiments of the present disclosure.
Figure 13B:
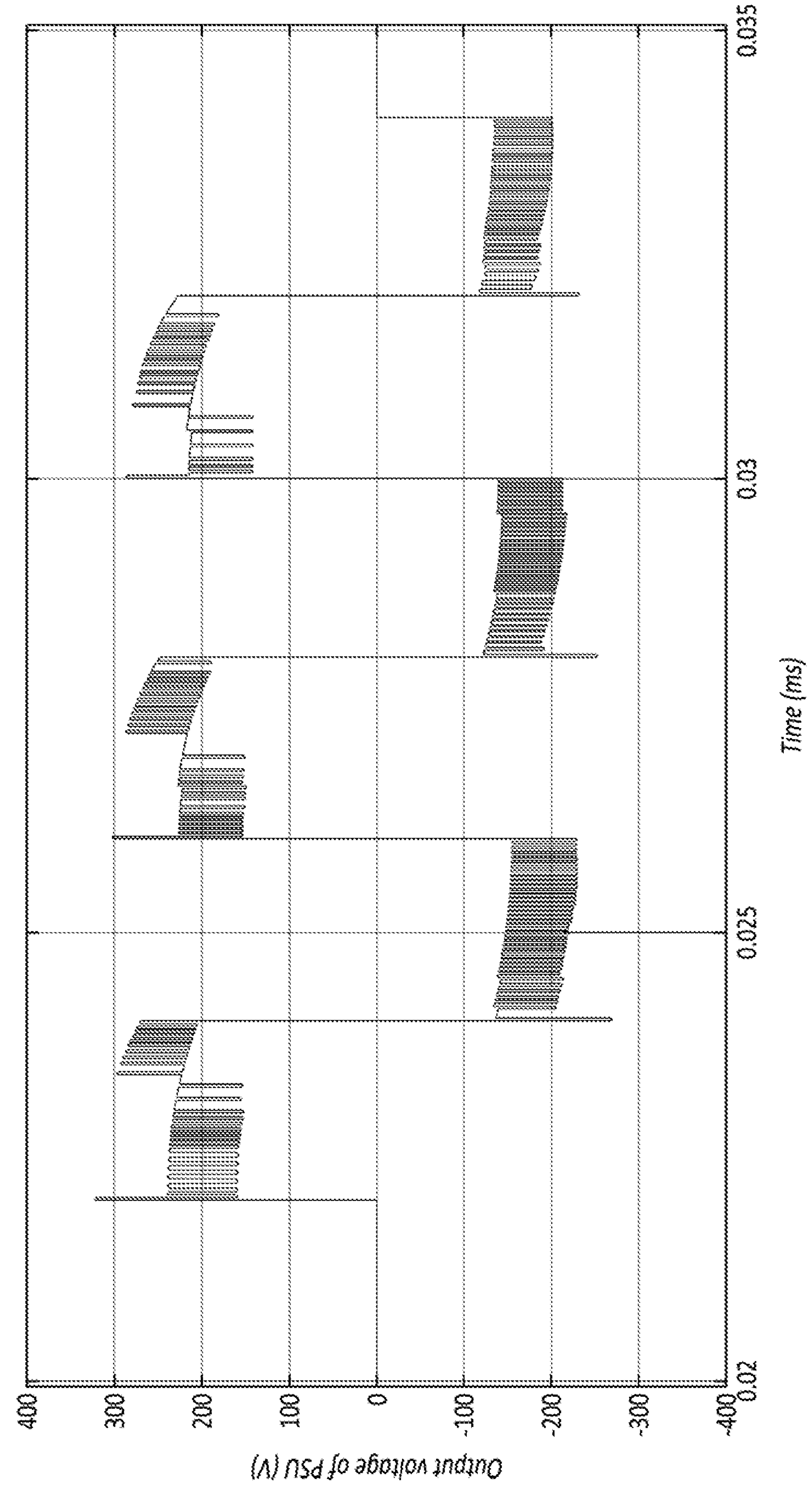
FIG. 13B illustrates resulting output voltage of a nine-level converter according to an embodiment depicted in FIG. 13A.

FIG. 13A illustrates output voltage of four exemplary cells according to embodiments of the present disclosure. FIG. 13B illustrates resulting output voltage of a nine-level converter according to an embodiment depicted in FIG. 13A.

As can be noted, at any moment of time, only one cell operates in a high frequency switching mode, while other three cells continuously provides positive, negative or zero voltage at the outputs.

Figure 14A:
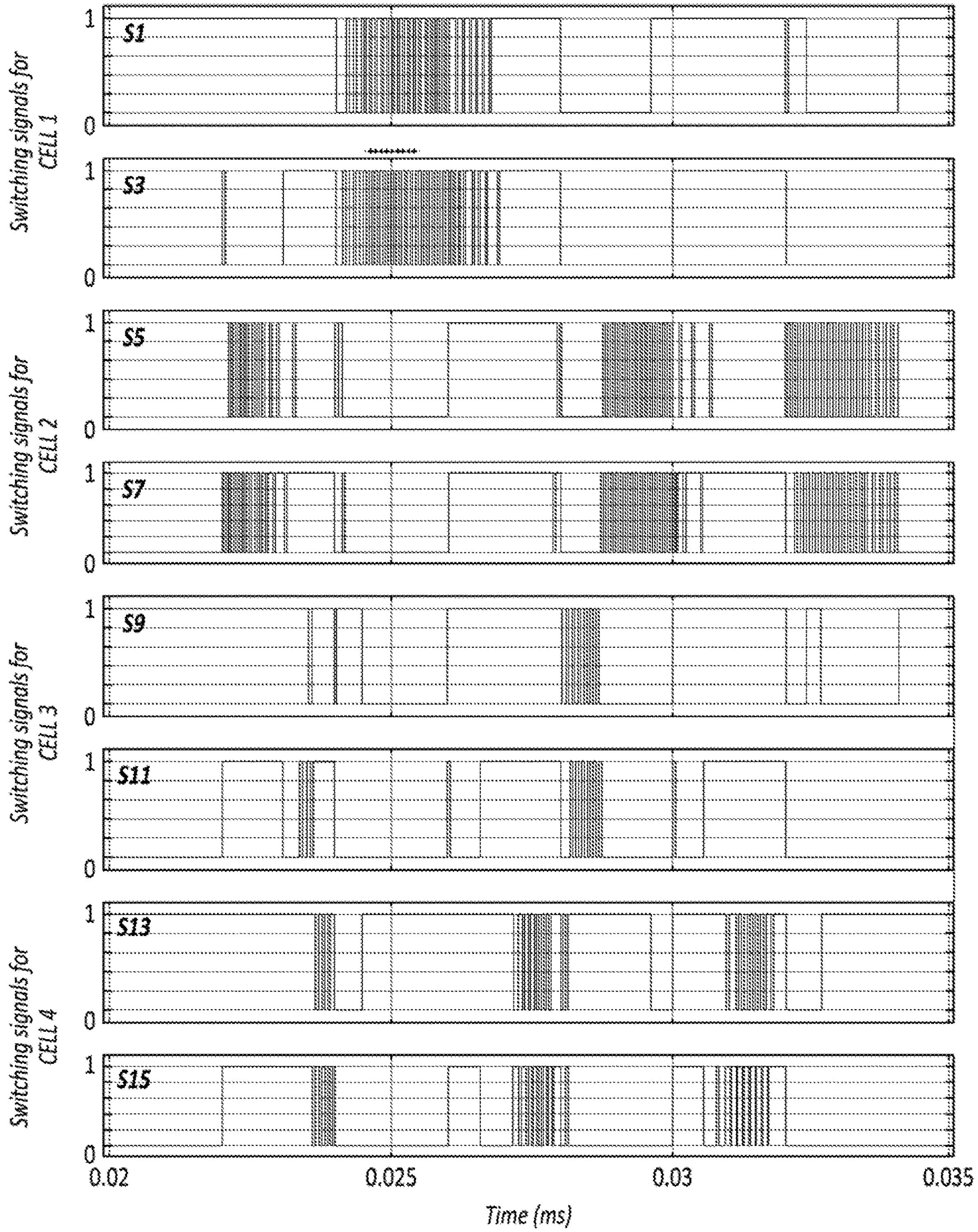
FIG. 14A illustrates control signals on switching elements of exemplary cells according to embodiments of the present disclosure.
Figure 14B:
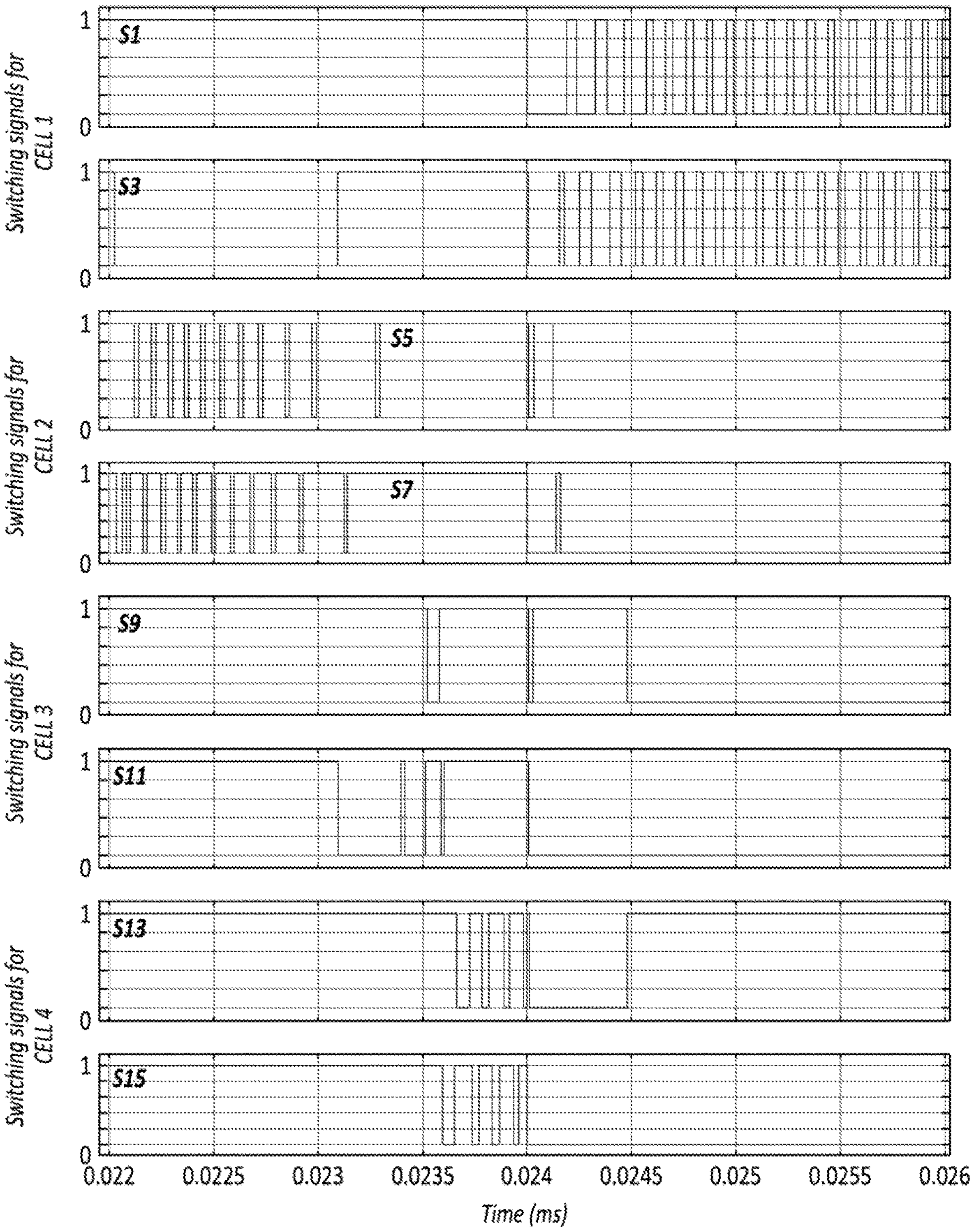
FIG. 14B illustrates a zoomed time window of the signals shown in FIG. 14A.

FIG. 14A illustrates control signals on switching elements of exemplary cells according to embodiments of the present disclosure. FIG. 14B illustrates a zoomed time window of the signals shown in FIG. 14A.

Please note that the signals on top switching elements of H-bridge based cells are shown only (S1, S3, S5, S7, etc.). The control signals on bottom switching elements (S2, S4, S6, S8, etc.) can be obtained by inverting the signals for top ones. As can be observed from the figures, because of the proper zero switching state rotation all switches are involved in high frequency switching operation. This leads to equal distribution of switching losses among the switches. Moreover, the switching frequency of all switches is twice less than the frequency of the resulting voltage at the output of nine-level converter.

Simulation and experimental results for multi-level cascaded converters according to embodiments of the present disclosure are presented in FIGS. 15A-16D. Turning to FIGS. 15A-15H, the simulation results (FIGS. 15A-15D) and experimental results (FIGS. 15E-15H) are shown for a single-phase nine-level 2-quadrant converter consisting of 4 cells connected in series with capacitive storage element on a DC-link side as depicted in FIG. 2A. The converter is operated in conjunction with an electromagnet, which is represented as the RL-load in FIG. 2A, and controlled by a multilevel current hysteresis controller in accordance with the embodiments presented herein. The simulation model and experimental setup have the same parameters for storage capacitors, magnet inductance and resistance, as well as initial DC-link voltage and output current profile.

Figures 15A, 15B, 15C, 15D:
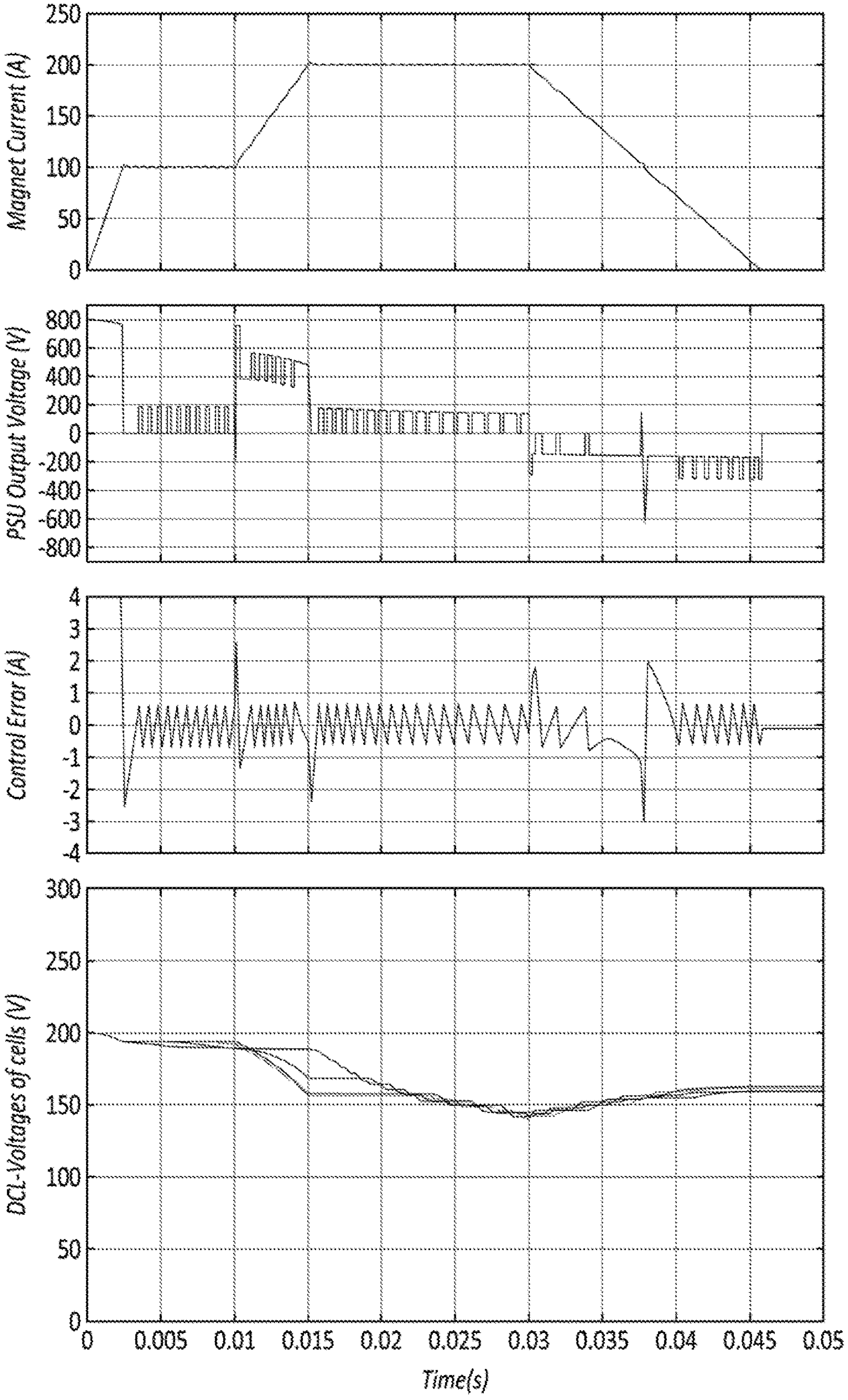
FIGS. 15A, 15B, 15C and 15D illustrate exemplary simulated results for an electromagnet driven by a multi-level cascaded converter comprising a single-phase nine-level 2-quadrant converter according to embodiments of the present disclosure.
Figure 15E:
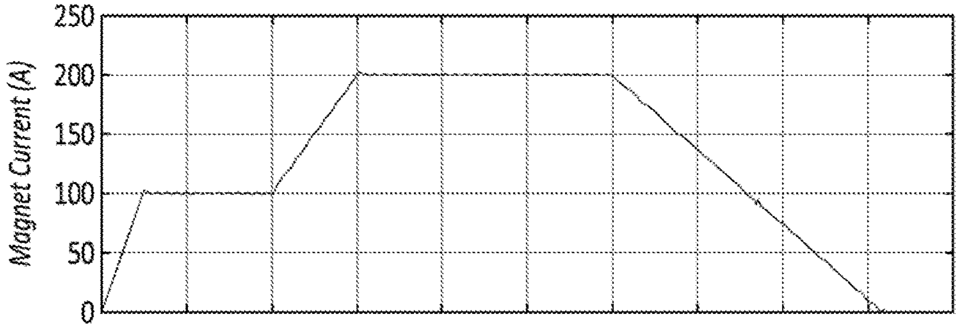
FIGS. 15E, 15F, 15G and 15H illustrate exemplary experimental results for an electromagnet driven by a multi-level cascaded converter comprising a single-phase nine-level 2-quadrant converter according to embodiments of the present disclosure.
Figure 15F:
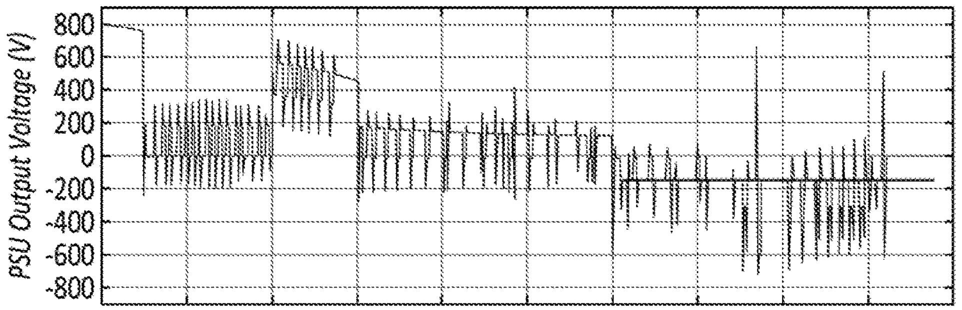
Figure 15G:
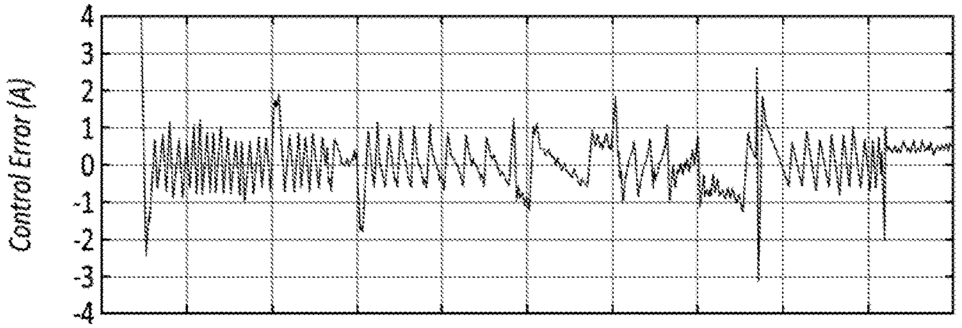
Figure 15H:
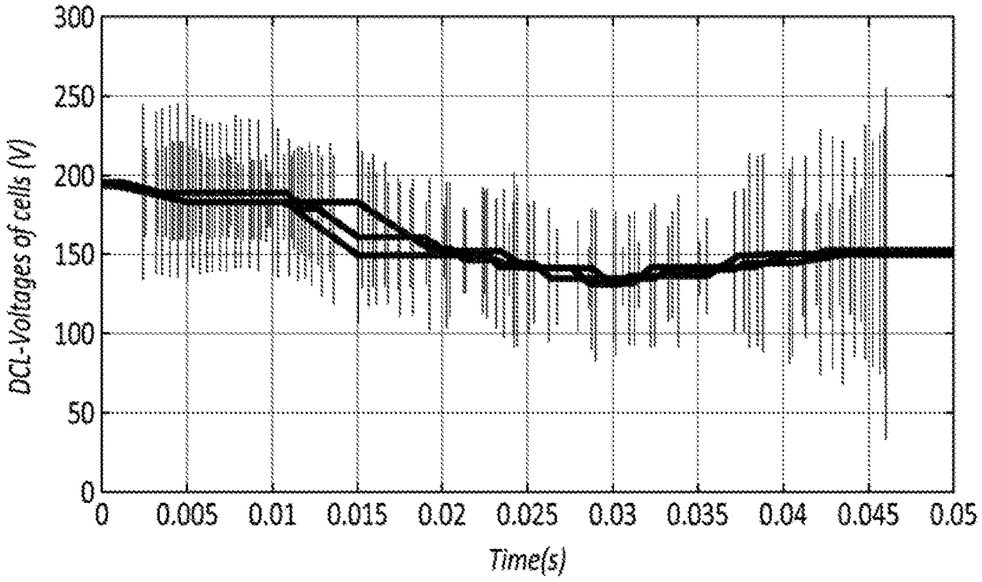

As shown in FIGS. 15A, 15B, 15E and 15F, the magnet's currents and PSU output voltages are identical except for the high frequency spikes in the experimental voltage waveform, which were caused by stray parameters of power cables between PSU and electromagnet and were not simulated. As shown in FIGS. 15C and 15G, the control error signals for both the simulation and experimental cases are almost identical and their pick values don't exceed 3 A (1.5% of maximum value). As shown in FIGS. 15D and 15H, a behavior of discharge of the storage capacitor is also identical for the simulation and experimental results.

FIGS. 16A, 16B, 16C and 16D show the simulation and experimental results of a single-phase seven-level 4-quadrant converter consisting of 3 cells connected in series with a capacitive storage element on a DC-link side, similar to the nine-level converter depicted in FIG. 1A. The converter is operated in conjunction with an electromagnet, which is represented as the RL-load in FIG. 1A, and controlled by a multilevel current hysteresis controller in accordance with the embodiments presented herein. The simulation model and experimental setup have the same parameters for storage capacitors, magnet inductance and resistance, as well as initial DC-link voltage and output current profile.

Figure 16A:
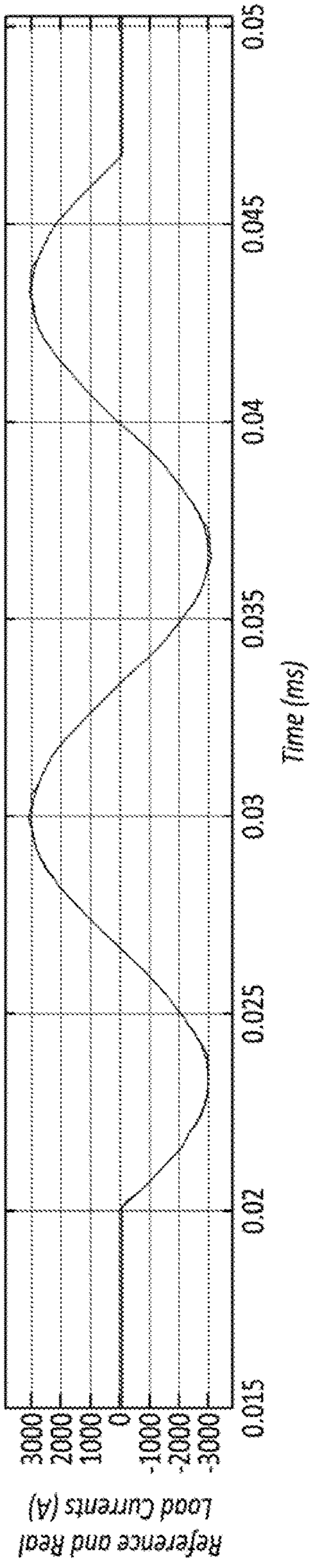
FIGS. 16A, 16B and 16C illustrate exemplary simulated results for an electromagnet driven by a multi-level cascaded converter comprising a single-phase seven-level 4-quadrant converter according to embodiments of the present disclosure.
Figure 16B:
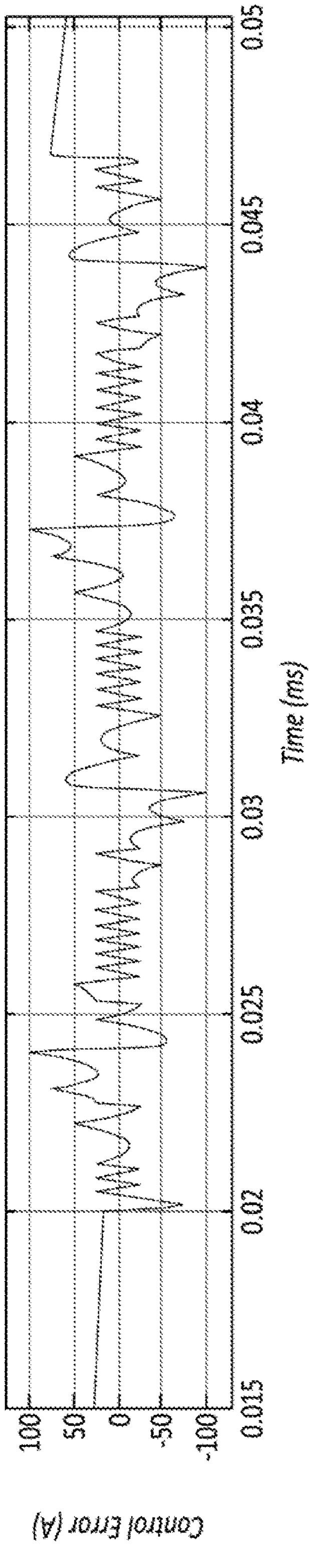
Figure 16C:
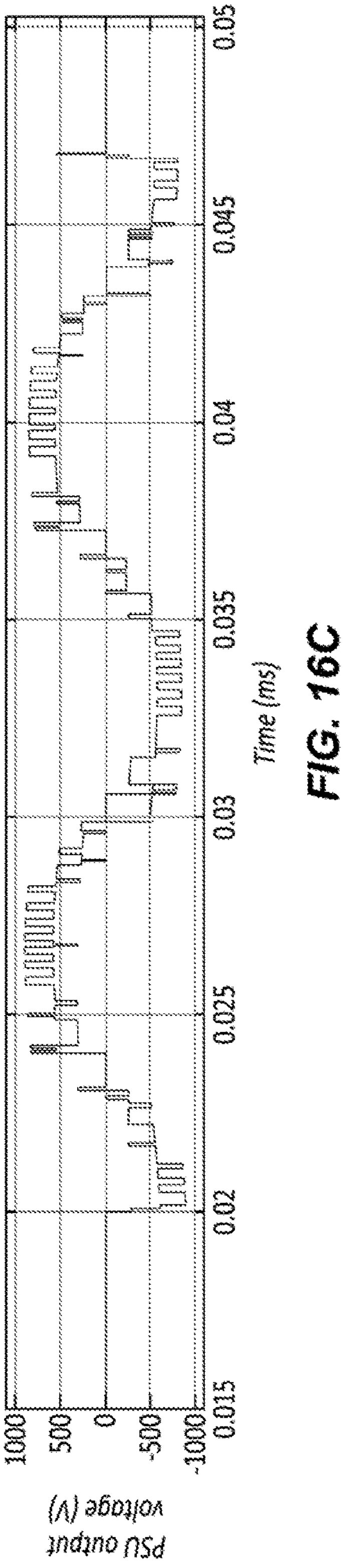
Figure 16D:
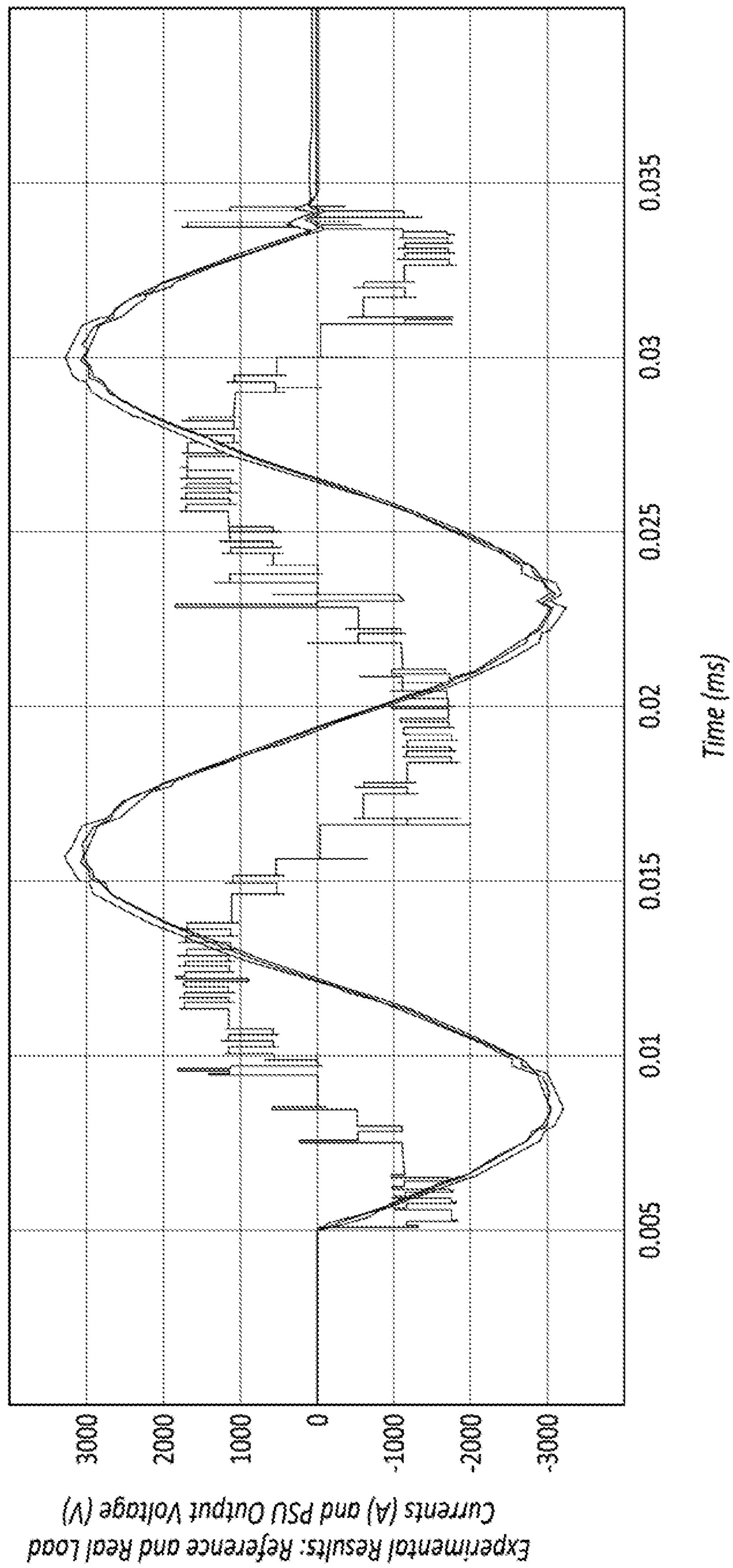
FIG. 16D illustrates exemplary experimental results for real and reference magnet currents, control error signals and PSU output voltages over time for an electromagnet driving multi-level cascaded converter comprising a single-phase seven-level 4-quadrant converter according to embodiments of the present disclosure.

As shown in FIGS. 16A, 16C and 16D, the magnet's currents and PSU output voltages are identical except for the high frequency spikes in experimental voltage waveform, which were caused by stray parameters of power cables between PSU and electromagnet and were not simulated.

As shown in FIGS. 16B and 16D, the control error signals for both the simulation and experimental cases are almost identical and their pick values don't exceed 100 A (3.3% of maximum value).

Simulation results for multi-level cascaded converters according to embodiments of the present disclosure and used in conjunction with a switched reluctance motor (SRM) are presented in FIGS. 18A-20E.

Figure 17:
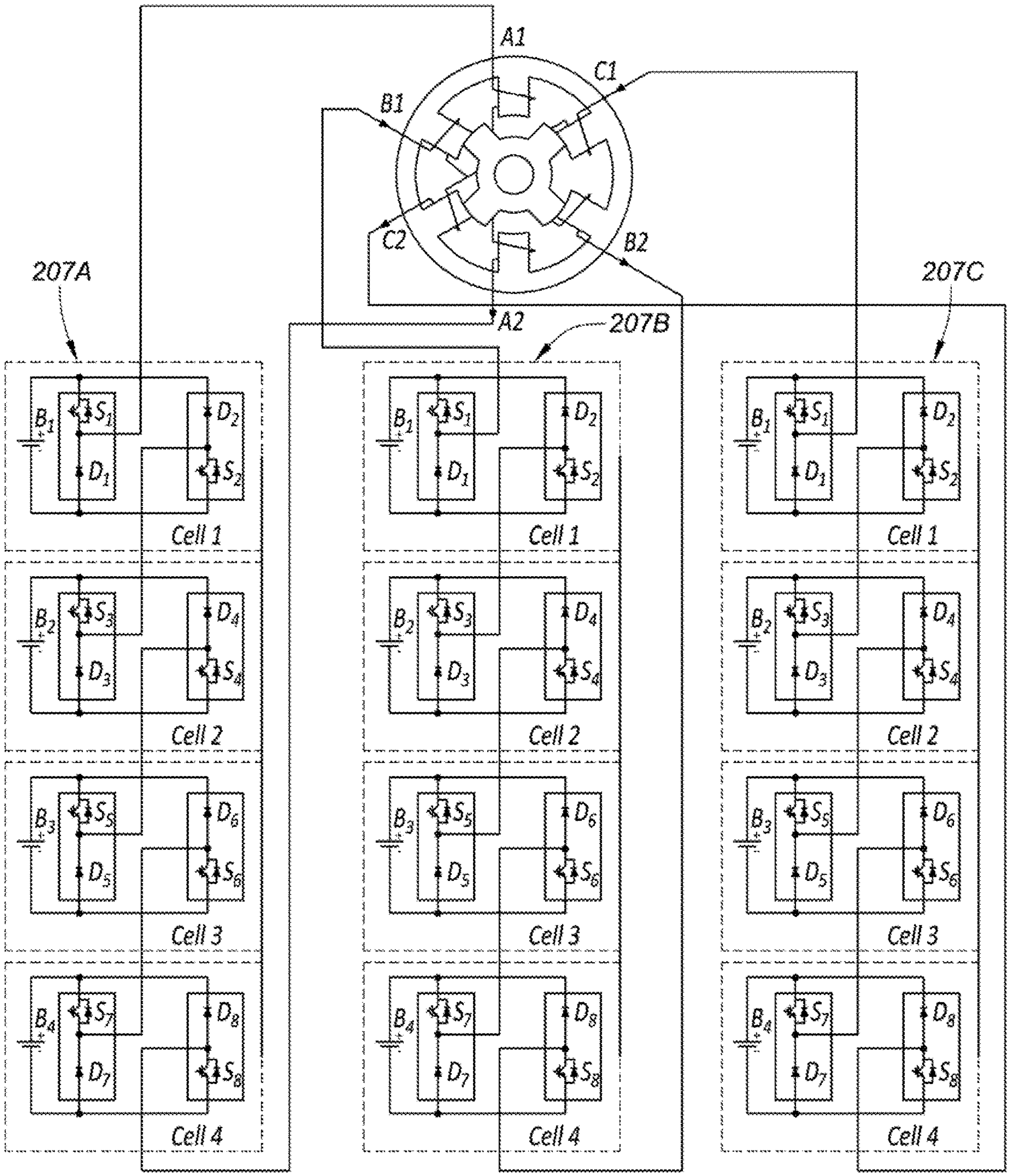
FIG. 17 illustrates a schematic of a switched reluctance motor driven by three independent nine-level 2-quadrant multilevel converters according to embodiments of the present disclosure.
Figures 18A, 18B, 18C, 18D:
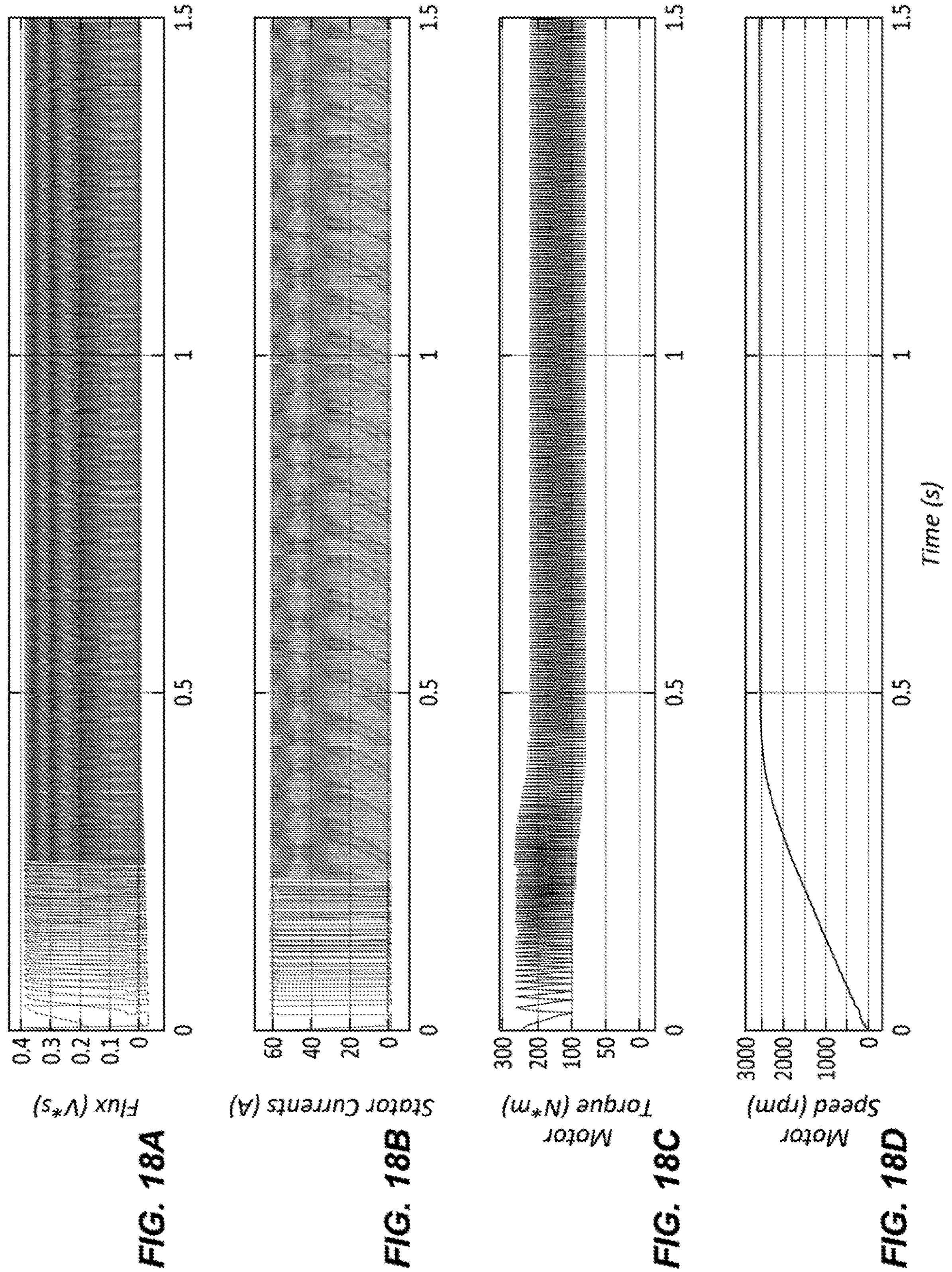
FIGS. 18A, 18B, 18C and 18D illustrate exemplary simulated results for a switched reluctance motor driven by three independent nine-level 2-quadrant multilevel converters according to embodiments of the present disclosure.
Figures 19A, 19B, 19C, 19D:
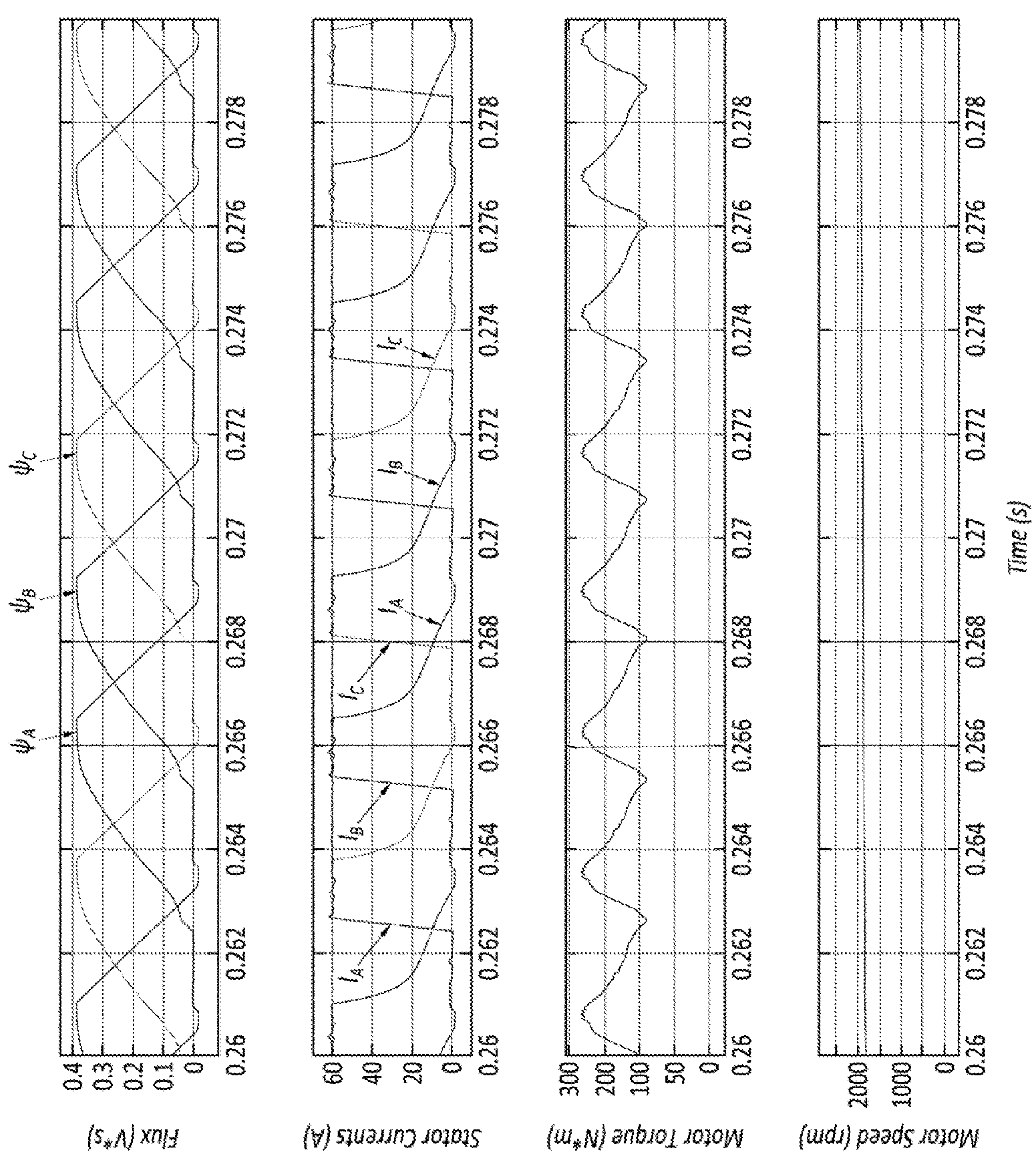
FIGS. 19A, 19B, 19C and 19D illustrate exemplary simulated results for a switched reluctance motor driven by three independent nine-level 2-quadrant multilevel converters according to embodiments of the present disclosure.

Turning to FIG. 17, a schematic diagram of a 3-phase 6/4 SRM driven by three independent nine-level 2-quadrant multilevel converters 207A, 207B and 207C is presented. Applications of SRM drives have increased in recent years due to such advantages as a robust structure, inherent mechanical strength and low cost, as well as being free from rotor windings and permanent magnets. Besides the simple machine construction, an SRM drive also has inherent fault-tolerance, high starting torque and high efficiency over a very wide operating speed. These features make it potentially attractive for future higher power variable speed applications such as traction, pumps and compressors, wind-turbines and mining applications. The power levels for these drive applications extend up to several megawatts. To achieve the full potential of a multi-megawatt SRM drive system, the operating voltages need to be at several kilovolts.

The multiple voltage levels available from the multilevel converter in combination with proposed multilevel hysteresis control technique of the present embodiments make it possible to achieve a high output voltage and flexible current profiling for SRM drives with the added benefit of lower switching frequencies and less converter and motor losses.

Referring to back to FIG. 17, each of three independent nine-level 2-quadrant multilevel converters 207A, 207B and 207C, like the converter 207 presented and discussed with regard to FIGS. 2A and 2B, comprises four 2-quadrant cells with a battery or any other storage or isolated voltage source elements on DC-link side and connected in series at the output. Each of three nine-level converters is also controlled by a separate and independent multi-level current hysteresis control system in accordance with the present embodiments. Thus, the control methodology presented herein can be used for any number of phases of a SRM (for instance 4-phase 8/6 SRM or 5-phase and 10/8 SRM) without any restrictions or additional limitations.

Figures 20A, 20B, 20C, 20D, 20E:
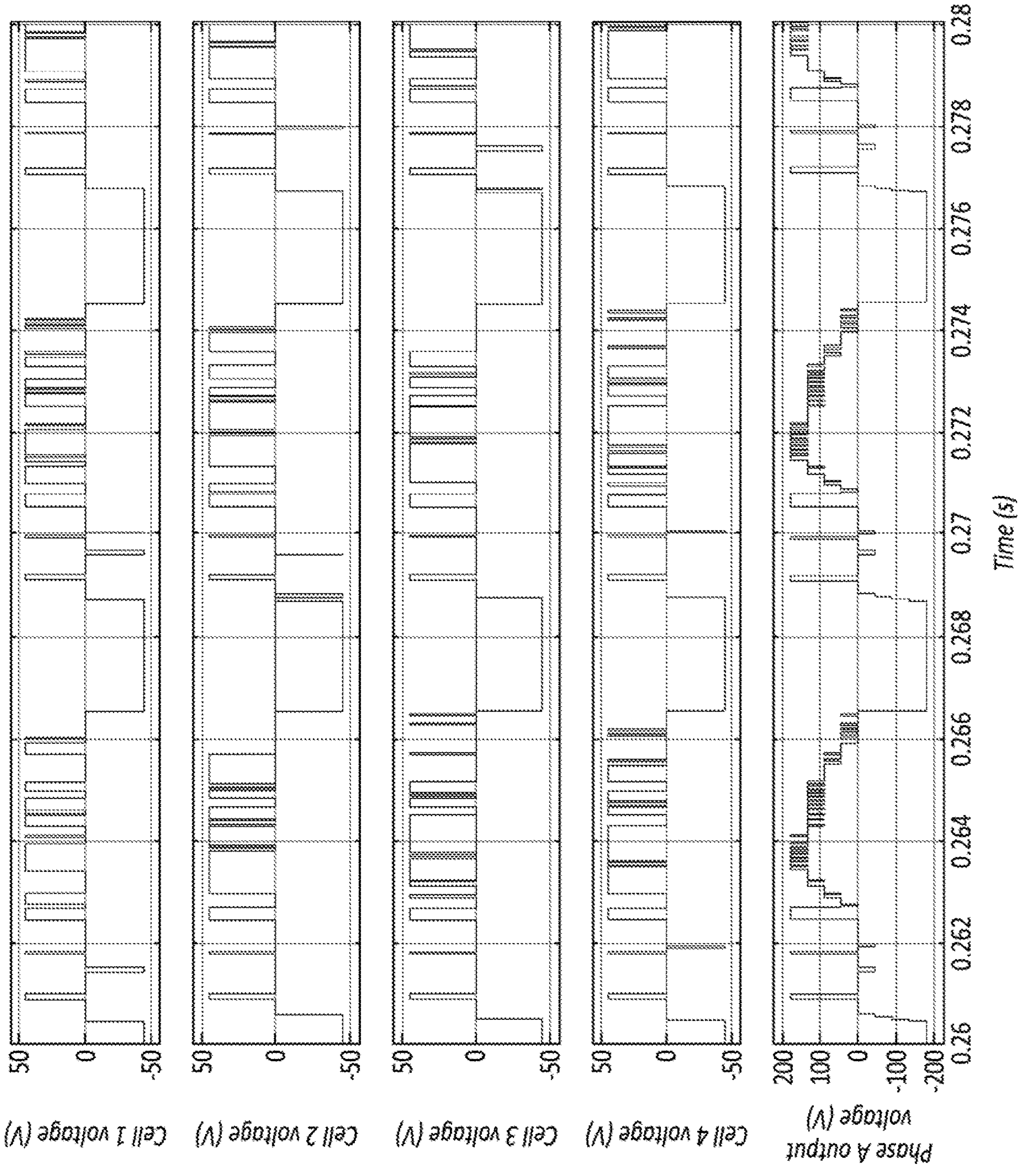
FIGS. 20A, 20B, 20C, 20D and 20E illustrate exemplary simulated results for a switched reluctance motor driven by three independent nine-level 2-quadrant multilevel converters according to embodiments of the present disclosure.

FIG. 18A-20E show the simulation results of a 60 kW 3-phase 6/4 SRM driven by three independent nine-level 2-quadrant multilevel converters. FIGS. 18A-19D present the flux-Linkages (FIGS. 18A and 19A), Stator Phase currents (FIGS. 18B and 19B), Motor Torque (FIGS. 18C and 19C), and Motor Speed (FIGS. 18D and 19D). As shown in FIGS. 19A and 19B, the motor torque and speed are saddled at their reference values of 100 Nm and 1800 rpm, respectively, after 0.5 second of operation. The phase currents, as well as motor torque are free from high frequency pulsations, as shown in FIG. 19B and FIG. 19C, respectively, because of the adaptive operation of multi-level hysteresis control methodology presented herein, which sets and commutates low voltage levels of cells according to reference phase currents and instantaneous flux-linkage values. The output voltages of all cells of one converter, as well as its total output voltage applied to phase A of SRM are depicted in FIGS. 20A-20E. As shown in FIG. 20E, each level of voltage at the output of a multi-level converter, corresponds to a DC-Link voltage of storage element of one cell VDC=50V. As shown in FIGS. 20A-20D, at any moment of time, only one cell operates in a high frequency switching mode, while the other three cells continuously provide positive, negative or zero voltage at the outputs.

The hysteresis control methodology presented herein allows controlling the phase currents of the SRM with high tolerance and low control error in a full range of speed.

The processors of the control systems and controllers of the present disclosure may be configured to perform the computations and analyses described in the present disclosure and may include or be communicatively coupled to one or more memories including non-transitory computer readable medium. It may include a processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "processor" or "computer."

Functions of the processor may be implemented using either software routines, hardware components, or combinations thereof. The hardware components may be implemented using a variety of technologies, including, for example, integrated circuits or discrete electronic components. The processor unit typically includes a readable/writeable memory storage device and typically also includes the hardware and/or software to write to and/or read the memory storage device.

The processors may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor may also include a storage device, which may be a hard disk drive or a removable storage drive such as, e.g., an optical disk drive and the like. The storage device may also be other similar means for loading computer programs or other instructions into the computer or processor.

The processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the processors as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" may be interchangeable, and include any computer program stored in memory for execution by a computer, including RAM memory, ROM memory, EEPROM memory, and non-volatile RAM (NVRAM) memory. The above memory types are exemplary only, and are thus not limiting as to the types of memory usable for storage of a computer program.

Embodiments of the present disclosure are directed to a multi-quadrant multi-level cascaded converter connectable to a load. In embodiments, the multi-quadrant multi-level cascaded converter comprises a plurality of cells connected in series. In embodiments, each cell of the plurality of cell represents an H-bridge converter and comprises a plurality of bidirectional switches and a storage element. In embodiments, the multi-quadrant multi-level cascaded converter further comprises a hysteresis current control system coupled to the plurality of cells. In embodiments, the control system is configured to control one or more of a shape and a level of current in the load.

In embodiments, the multi-quadrant multi-level cascaded converter further comprises four (4) quadrants and nine (9) output levels. In embodiments, the multi-quadrant multi-level cascaded converter further comprises four (4) cells connected in series, and wherein each cell represents a four-quadrant H-bridge converter. In embodiments, each cell of the plurality of cells comprises four (4) bidirectional switches and a storage element.

In embodiments, the multi-quadrant multi-level cascaded converter further comprises two (2) quadrants and nine (9) output levels. In embodiments, the multi-quadrant multi-level cascaded converter further comprises four (4) cells connected in series, and wherein each cell represents a two-quadrant H-bridge converter. In embodiments, each cell of the plurality of cells comprises two (2) bidirectional switches, two (2) diodes, and a storage element.

In embodiments, each bidirectional switch comprises IGBT or MOSFET with freewheeling diode.

In embodiments, the isolated converter is one of an isolated AC/DC or an isolated DC/AC converter.

In embodiments, electrical power is transferrable from each cell of the plurality of cells to the load. In embodiments, electrical power is transferrable from the load to each cell of the plurality of cells in the case of a reactive or regenerative load.

In embodiments, the load is one of a single phase or multiple-phased resistive and inductive load, or pure reactive load, or any type of regenerative load.

In embodiments, the control system is further configured to cause the transfer of electrical power from the energy storage elements of the power cells to the load.

In embodiments, the control system is further configured to recover energy back to the storage elements when the load is a reactive or regenerative load.

In embodiments, the control system is further configured to balance voltages on the energy storage elements.

In embodiments, the balance of voltages includes selection of the energy storage elements with the minimum and maximum voltages, and determination of whether to extract energy from a selected energy storage element.

In embodiments, the balance of voltages includes determination of whether to extract energy from a selected energy storage element into the load or inject energy from the load into the selected energy storage element when the load is a reactive or regenerative load.

In embodiments, the control system is further configured to minimize commutation of the switching elements through zero switching rotation.

In embodiments, the storage element is a capacitor.

In embodiments, the control system includes one or more processors coupled to a non-transitory memory comprising a plurality of instructions that when executed causes the one or more processors to control one or more of a shape and a level of current in the load.

In embodiments, the plurality of instructions when executed causes the one or more processors to control an output voltage level of the converter as a function of the level of current in the load, a reference current and a current error equal to the difference between the level of current in the load and the reference current.

In embodiments, the plurality of instructions when executed causes the one or more processors to determine a voltage on a storage element for each cell of the plurality of cells, select a cell of the plurality of cells based on the voltages on the storage elements of the plurality of cells, and repetitively switch the selected cell to provide a required output voltage level and regulation of output current.

In embodiments, the plurality of instructions when executed further causes the one or more processors to extract energy from the selected cell into a reactive or regenerative load.

In embodiments, the plurality of instructions when executed further causes the one or more processors to extract energy from a reactive or regenerative load into the selected cell.

In embodiments the plurality of instructions when executed causes the one or more processors to provide a zero-voltage for a first positive/negative operational level of the cell using a first subset of the plurality of bidirectional switches, and provide a zero voltage for a second positive/negative operational level of the cell using a second subset of the plurality of bidirectional switches. In embodiments, the first subset is different from the second subset. In embodiments, the second positive/negative operational level of the cell is directly subsequent the first positive/negative operational level of the cell.

In embodiments, the plurality of instructions when executed causes the one or more processors to subtract a real feedback current signal $I_{REAL}$ from a reference current signal $I_{REF}$ to produce a current error signal $I_{ERROR}$.

In embodiments, the plurality of instructions when executed causes the one or more processors to input the current error signal $I_{ERROR}$ into each hysteresis block of a plurality of hysteresis blocks. In embodiments, each hysteresis block of the plurality of hysteresis blocks has a different setting of high boundary (HB) threshold and low boundary (LB) threshold than the other hysteresis blocks of the plurality of hysteresis blocks.

In embodiments, the plurality of instructions when executed causes the one or more processors to, for each hysteresis block of the plurality of hysteresis blocks, set an output value of the hysteresis block to “1” when $I_{ERROR}$ reaches the high boundary (HB) threshold of the hysteresis block, maintain the output value of the hysteresis block at “1” until $I_{ERROR}$ reaches the low boundary (LB) threshold of the hysteresis block, and set the output value of the hysteresis block to “0” when $I_{ERROR}$ reaches the low boundary (LB) threshold of the hysteresis block.

In embodiments, the plurality of instructions when executed causes the one or more processors to sum the output values of all of the hysteresis blocks of the plurality of hysteresis blocks to produce a total state value.

In embodiments, the plurality of instructions when executed causes the one or more processors to select the required output voltage level from a lookup table as a function of the total state value.

In embodiments, the selection of the required output voltage is a function of the total state value and a sign of current derivative di/dt.

In embodiments, the current derivative is one of real or reference.

In embodiments, the sign of the current derivative di/dt is determined as positive at a moment of time when the total state value reaches a value of six (6).

In embodiments, the sign of the current derivative di/dt is determined as negative at a moment of time when the total state value reaches a value of one (1).

Embodiments of the present disclosure are directed to a method of balancing voltages on a plurality of cells of a multi-quadrant multi-level cascaded converter. In embodiments, the method comprises, for each cell of the plurality of cells, determining a voltage on a storage element of the cell. In embodiments, the method further comprises selecting, based on the voltages on the storage elements of the plurality of cells, a selected cell of the plurality of cells. In embodiments, the method further comprises repetitively switching the selected cell to provide a required output voltage level and regulation of output current.

In embodiments, the method further comprises extracting energy from the selected cell into a reactive or regenerative load.

In embodiments, the method further comprises extracting energy from a reactive or regenerative load into the selected cell.

In embodiments, the storage elements are capacitors.

Embodiments of the present disclosure are directed to a method of distributing energy among a plurality of bidirectional switches of a cell of a plurality of cells in a multi-quadrant multi-level cascaded converter. In embodiments, the method comprises using a first subset of the plurality of bidirectional switches to provide a zero-voltage for a first positive/negative operational level of the cell, and using a second subset of the plurality of bidirectional switches to provide a zero voltage for a second positive/negative operational level of the cell. In embodiments, the first subset is different from the second subset. In embodiments, the second positive/negative operational level of the cell is directly subsequent the first positive/negative operational level of the cell.

Embodiments of the present disclosure are directed to a method of selecting a required output voltage level of a multi-quadrant multi-level cascaded converter. In embodiments, the method comprises subtracting a real feedback current signal $I_{REAL}$ from a reference current signal $I_{REF}$ to produce a current error signal $I_{ERROR}$. In embodiments, the method further comprises inputting the current error signal $I_{ERROR}$ into each hysteresis block of a plurality of hysteresis blocks. In embodiments, each hysteresis block of the plurality of hysteresis blocks has a different setting of high boundary (HB) threshold and low boundary (LB) threshold than the other hysteresis blocks of the plurality of hysteresis blocks.

In embodiments, the method further comprises, for each hysteresis block of the plurality of hysteresis blocks, when $I_{ERROR}$ reaches the high boundary (HB) threshold of the hysteresis block, setting an output value of the hysteresis block to "1".

In embodiments, the method further comprises maintaining the output value of the hysteresis block at "1" until $I_{ERROR}$ reaches the low boundary (LB) threshold of the hysteresis block.

In embodiments, the method further comprises, when $I_{ERROR}$ reaches the low boundary (LB) threshold of the hysteresis block, setting the output value of the hysteresis block to "0".

In embodiments, the method further comprises summing the output values of all of the hysteresis blocks of the plurality of hysteresis blocks to produce a total state value.

In embodiments, the method further comprises selecting, from a lookup table based upon the total state value, the required output voltage level.

In embodiments, selecting the required output voltage is based upon the total state value and a sign of current derivative di/dt.

In embodiments, the current derivative is one of real or reference.

In embodiments, the sign of the current derivative di/dt is determined as positive at a moment of time when the total state value reaches a value of six (6).

In embodiments, the sign of the current derivative di/dt is determined as negative at a moment of time when the total state value reaches a value of one (1).

All features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Express recitation of every possible combination and substitution is overly burdensome, especially given that the permissibility of each and every such combination and substitution will be readily recognized by those of ordinary skill in the art upon reading this description.

In many instances entities are described herein as being coupled to other entities. It should be understood that the terms "coupled" and "connected" or any of their forms are used interchangeably herein and, in both cases, are generic to the direct coupling of two entities without any non-negligible e.g., parasitic intervening entities and the indirect coupling of two entities with one or more non-negligible intervening entities. Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A multi-level cascaded converter system, comprising:

a plurality of cells connected in series, wherein each cell of the plurality of cells comprising a plurality of switching elements and an energy storage element;

a voltage sensing system configured to determine a voltage of the energy storage element of each cell of the plurality of cells; and a control system configured to:

identify, based on the voltages of the energy storage elements, a first cell having a maximum voltage and a second cell having a minimum voltage;

select the first cell to provide positive output voltage levels to transfer energy from the first cell to a load; and select the second cell to provide negative output voltage levels to receive energy from a reactive or regenerative load into the second cell.

2. The system of claim 1, wherein the energy storage element comprises one or more of a capacitor, a supercapacitor, or a battery.

3. The system of claim 1, wherein the control system is further configured to balance voltages across the energy storage elements of the plurality of cells during operation.

4. The system of claim 1, wherein each cell represents an H-bridge converter comprising four bidirectional switches.

5. The system of claim 4, wherein each bidirectional switch comprises an IGBT or a MOSFET with a freewheeling diode.

6. The system of claim 1, wherein the control system is further configured to distribute switching losses among the switching elements by providing a zero-voltage output using a first combination of switching elements during a first operational cycle and providing a zero-voltage output using a second combination of switching elements during a second operational cycle, wherein the first combination is different from the second combination.

7. The system of claim 1, wherein the plurality of cells comprises four cells connected in series providing nine output voltage levels.

8. The system of claim 1, wherein the load comprises one or more of an electromagnet, an electric motor, or a grid-connected energy storage system.

9. The system of claim 1, wherein the control system includes one or more processors coupled to a non-transitory memory comprising instructions that, when executed, cause the one or more processors to identify the first cell and the second cell and select the first cell and the second cell based on the voltages of the energy storage elements.

10. The system of claim 1, wherein the control system is further configured to equally distribute energy stored in or transferred via the energy storage elements among all cells.

11. A method of controlling a multi-level cascaded converter having a plurality of series-connected cells, each cell having an energy storage element, the method comprising:

determining a voltage of the energy storage element of each cell;

identifying, based on the voltages of the energy storage elements, a first cell having a maximum voltage and a second cell having a minimum voltage;

during a first operating condition in which energy is transferred to a load, selecting the first cell to provide a positive output voltage level; and during a second operating condition in which energy is recovered from the load, selecting the second cell to receive energy from the load.

12. The method of claim 11, wherein the energy storage element comprises one or more of a capacitor, a supercapacitor, or a battery.

13. The method of claim 11, further comprising balancing voltages across the energy storage elements of the plurality of cells during operation.

14. The method of claim 11, wherein each cell represents an H-bridge converter comprising four bidirectional switches.

15. The method of claim 14, wherein each bidirectional switch comprises an IGBT or a MOSFET with a freewheeling diode.

16. The method of claim 11, further comprising distributing switching losses among switching elements by providing a zero-voltage output using a first combination of switching elements during a first operational cycle and providing a zero-voltage output using a second combination of switching elements during a second operational cycle, wherein the first combination is different from the second combination.

17. The method of claim 11, wherein the plurality of cells comprises four cells connected in series providing nine output voltage levels.

18. The method of claim 11, wherein the load comprises one or more of an electromagnet, an electric motor, or a grid-connected energy storage system.

19. The method of claim 11, wherein determining, identifying, and selecting are performed by one or more processors executing instructions stored in a non-transitory memory.

20. The method of claim 11, further comprising equally distributing energy stored in or transferred via the energy storage elements among all cells.

* * * * *